(12) United States Patent
Steenblock et al.

(10) Patent No.: US 12,187,511 B2
(45) Date of Patent: Jan. 7, 2025

(54) MULTI-FILM THERMOPLASTIC BAGS HAVING HEM SEALS COMPRISED OF CONTINUOUS CONTACT AREAS AND METHODS OF MAKING THE SAME

(71) Applicant: THE GLAD PRODUCTS COMPANY, Oakland, CA (US)

(72) Inventors: Sarah J. Steenblock, Cincinnati, OH (US); Matthew W. Waldron, West Chester, OH (US); Karen McAffry, Willowbrook, IL (US); Edward B. Tucker, Willowbrook, IL (US); Shaun T. Broering, Fort Thomas, KY (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 18/330,138

(22) Filed: Jun. 6, 2023

(65) Prior Publication Data
US 2023/0312201 A1    Oct. 5, 2023

Related U.S. Application Data

(63) Continuation of application No. 17/585,211, filed on Jan. 26, 2022, now Pat. No. 11,814,225, which is a
(Continued)

(51) Int. Cl.
*B65D 65/40* (2006.01)
*B32B 7/05* (2019.01)
(Continued)

(52) U.S. Cl.
CPC ............. *B65D 65/40* (2013.01); *B32B 7/05* (2019.01); *B32B 7/10* (2013.01); *B32B 37/10* (2013.01);
(Continued)

(58) Field of Classification Search
CPC .......... B65D 65/40; B65D 33/28; B32B 7/05; B32B 7/10
See application file for complete search history.

(56) References Cited

U.S. PATENT DOCUMENTS

| | | |
|---|---|---|
| 3,029,853 A | 4/1962 | Piazze |
| 3,114,497 A | 12/1963 | Kugler |

(Continued)

FOREIGN PATENT DOCUMENTS

| | | |
|---|---|---|
| CN | 103648750 A | 3/2014 |
| CN | 204222116 U | 3/2015 |

(Continued)

OTHER PUBLICATIONS

U.S. Appl. No. 17/585,211, May 19, 2023, Office Action.
(Continued)

*Primary Examiner* — Derek J Battisti
(74) *Attorney, Agent, or Firm* — Keller Preece PLLC

(57) ABSTRACT

One or more implementations of a multi-film thermoplastic structure include a first film having a first appearance in contact with a second film having a second appearance at one or more visually distinct contact areas, including a continuous contact area spanning a width of the structure. In one or more implementations the multi-film thermoplastic structure comprises a thermoplastic bag and the continuous contact area forms a hem seal near a top opening of the thermoplastic bag.

20 Claims, 15 Drawing Sheets

Related U.S. Application Data continuation-in-part of application No. 17/167,390, filed on Feb. 4, 2021, now Pat. No. 11,970,310, which is a continuation-in-part of application No. PCT/US2020/024143, filed on Mar. 23, 2020.

(60) Provisional application No. 62/825,520, filed on Mar. 28, 2019.

(51) Int. Cl.
    *B32B 7/10*     (2006.01)
    *B32B 37/10*     (2006.01)
    *B32B 38/06*     (2006.01)
    *B65D 27/00*     (2006.01)
    *B65D 33/28*     (2006.01)

(52) U.S. Cl.
    CPC ............. *B32B 38/06* (2013.01); *B65D 27/00* (2013.01); *B32B 2250/02* (2013.01); *B32B 2250/24* (2013.01); *B32B 2307/4026* (2013.01); *B32B 2439/46* (2013.01); *B65D 33/28* (2013.01); *B65D 2203/00* (2013.01)

(56) References Cited

U.S. PATENT DOCUMENTS

| | | | |
|---|---|---|---|
| 3,512,456 A | 5/1970 | Meyer | |
| 3,543,999 A | 12/1970 | Kugler | |
| 3,738,568 A | 6/1973 | Ruda | |
| 3,772,968 A | 11/1973 | Ruda | |
| 4,493,683 A | 1/1985 | Jostler | |
| 4,558,463 A | 12/1985 | Boyd | |
| 4,878,764 A | 11/1989 | Meyer | |
| 4,883,675 A | 11/1989 | Wernz | |
| 5,554,093 A | 9/1996 | Porchia et al. | |
| 5,716,137 A | 2/1998 | Meyer | |
| 5,928,972 A | 7/1999 | Mashiko et al. | |
| 6,561,696 B1 | 5/2003 | Rusnak et al. | |
| 7,938,635 B2 | 5/2011 | Heilman et al. | |
| 8,876,382 B2 | 11/2014 | Wilcoxen et al. | |
| 9,393,757 B2 | 7/2016 | Borchardt et al. | |
| 9,604,429 B2 | 3/2017 | Borchardt et al. | |
| 9,745,126 B1 * | 8/2017 | Cobler .................. | B65F 1/0026 |
| 10,549,467 B2 | 2/2020 | Borchardt et al. | |
| 10,934,058 B2 * | 3/2021 | Cobler .................. | B65D 33/28 |
| 11,345,118 B2 | 5/2022 | Wilcoxen et al. | |
| 2004/0137200 A1 | 7/2004 | Chhabra et al. | |
| 2005/0123219 A1 | 6/2005 | Schneider | |
| 2007/0036472 A1 | 2/2007 | Persenda | |
| 2007/0257402 A1 | 11/2007 | Rasmussen | |
| 2009/0094943 A1 | 4/2009 | Heilman et al. | |
| 2010/0111452 A1 * | 5/2010 | Ross ...................... | B65D 33/28 |
| | | | 383/75 |
| 2010/0266222 A1 | 10/2010 | Rusnak et al. | |
| 2011/0052105 A1 | 3/2011 | Wilcoxen et al. | |
| 2012/0045153 A1 * | 2/2012 | Schmal .................. | A47J 36/16 |
| | | | 383/118 |
| 2012/0134606 A1 * | 5/2012 | Borchardt ............. | B65D 33/28 |
| | | | 156/196 |
| 2012/0269465 A1 | 10/2012 | Dorsey et al. | |
| 2015/0071574 A1 | 3/2015 | Fraser et al. | |
| 2015/0104121 A1 | 4/2015 | Broering et al. | |
| 2015/0191599 A1 | 7/2015 | Cobler | |
| 2017/0305104 A1 * | 10/2017 | Wilcoxen ................ | B32B 3/30 |
| 2018/0282025 A1 | 10/2018 | Odenthal | |
| 2022/0144516 A1 | 5/2022 | Waldron et al. | |
| 2022/0219864 A1 | 7/2022 | Steenblock et al. | |

FOREIGN PATENT DOCUMENTS

| | | |
|---|---|---|
| CN | 104918767 A | 9/2015 |
| CN | 207312156 U | 5/2018 |
| DE | 8634032 U1 | 3/1987 |
| DE | 4133095 | 10/1992 |
| DE | 202008013591 U1 | 2/2010 |
| DE | 102016116639 A1 | 3/2017 |
| EP | 266670 B1 | 3/1992 |
| EP | 953511 B1 | 3/2003 |
| EP | 1364892 B1 | 12/2005 |
| ES | 1061986 U | 5/2006 |
| FR | 2858807 A1 | 10/2005 |
| GB | 2009098 B | 2/1982 |
| JP | 2002179089 A | 6/2002 |
| JP | 4140337 B2 | 6/2008 |
| WO | WO 88/04635 | 6/1988 |
| WO | WO 2001/51372 A1 | 7/2001 |
| WO | WO 2005/016791 A1 | 2/2005 |
| WO | WO 2006/097104 A2 | 9/2006 |
| WO | 2016/040765 A1 | 3/2016 |

OTHER PUBLICATIONS

U.S. Appl. No. 17/585,211, Jul. 28, 2023, Notice of Allowance.
U.S. Appl. No. 17/167,390, Jul. 26, 2022, Office Action.
U.S. Appl. No. 17/167,390, Jan. 13, 2023, Office Action.
U.S. Appl. No. 17/167,390, May 3, 2023, Office Action.
U.S. Appl. No. 17/167,390, Dec. 20, 2023, Notice of Allowance.
U.S. Appl. No. 17/441,118, Jan. 12, 2024, Office Action.
PCT Application No. PCT/US2020/024143 International Search Report dated Jul. 15, 2020.
PCT Application No. PCT/US2020/024143 Written Opinion of the International Searching Authority dated Jul. 15, 2020.
Office Action as received in CN application 202080025253.8 dated Oct. 12, 2023.
U.S. Appl. No. 17/167,390, Sep. 6, 2023, Office Action.
U.S. Appl. No. 17/441,118, Apr. 18, 2024, Notice of Allowance.

\* cited by examiner

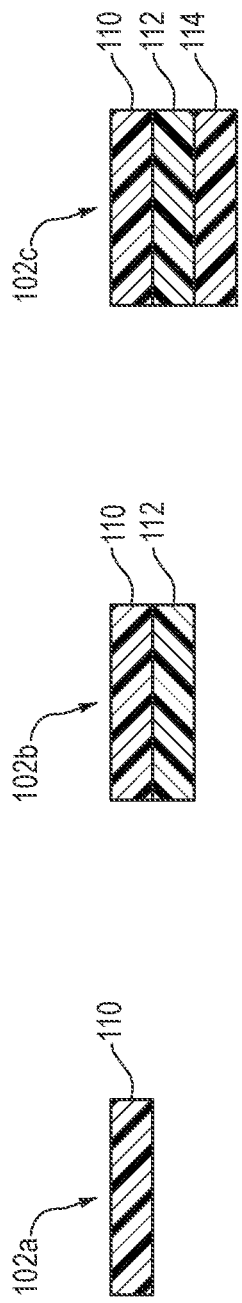
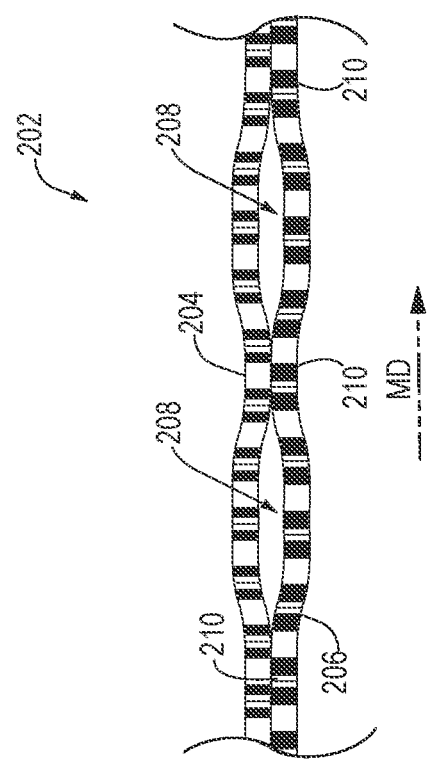
Fig. 1A  Fig. 1B  Fig. 1C
Fig. 2

MULTI-FILM THERMOPLASTIC BAGS HAVING HEM SEALS COMPRISED OF CONTINUOUS CONTACT AREAS AND METHODS OF MAKING THE SAME

CROSS-REFERENCE TO RELATED APPLICATIONS

The present application is a continuation-in-part of U.S. patent application Ser. No. 17/585,211, filed on Jan. 26, 2022 and entitled MULTI-FILM THERMOPLASTIC STRUCTURES HAVING VISUALLY-DISTINCT CONTACT AREAS ARRANGED IN TEXT AND METHODS OF MAKING THE SAME, which is a continuation-in-part of U.S. patent application Ser. No. 17/167,390, filed on Feb. 4, 2021 and entitled MULTI-FILM THERMOPLASTIC BAGS HAVING GRAB ZONES WITH CONTACT AREAS AND METHODS OF MAKING THE SAME, which is a continuation-in-part of International Application No. PCT/US2020/24143, filed on Mar. 23, 2020 and entitled: MULTI-FILM THERMOPLASTIC STRUCTURES AND BAGS HAVING VISUALLY-DISTINCT CONTACT AREAS AND METHODS OF MAKING THE SAME, which claims the benefit of and priority to U.S. Provisional Application No. 62/825,520, filed Mar. 28, 2019 and entitled: MULTI-FILM THERMOPLASTIC STRUCTURES AND BAGS HAVING VISUALLY-DISTINCT CONTACT AREAS AND METHODS OF MAKING THE SAME. The contents of the above-referenced application are hereby incorporated by reference in their entirety.

BACKGROUND

Among their many applications, thermoplastic bags are used as liners in trash or refuse receptacles. Such liners can be found at many locations from small household kitchen garbage cans to larger, multi-gallon drums located in public places and restaurants. Bags that are intended to be used as liners for such refuse containers are typically made from low-cost, pliable thermoplastic material. When the receptacle is full, the thermoplastic liner holding the trash can be removed for disposal and replaced with a new liner.

Increasing manufacturing costs for thermoplastic liners have led to a trending effort to decrease material usage (e.g., by making thinner webs). As a result, some conventional thermoplastic liners are prone to tearing, ruptures, and other issues, particularly at the top of the bag. For example, when grabbing conventional thermoplastic liners by a drawstring to pull the thermoplastic liner up and out of a trash receptacle, the weight of the trash combined with the upwards pulling force from the drawstring can cause a conventional thermoplastic liner to tear at or near the hem channel. Similarly, for instance, when grasping a conventional thermoplastic liner by a top portion, a grasping hand (e.g., fingers) can puncture or overly stretch (leading to subsequent failure of) the thermoplastic liner. In turn, such compromising of the top of the bag can lead to trash spillage, require an adjusted/awkward carrying position or method, etc.

Along related lines, conventional processes for securing the hem channel of a thermoplastic liner can introduce additional structural weaknesses at or near the hem channel. For example, hem seals formed utilizing conventional methods, such as heat bars, hot air manifolds, or other conventional systems, can overly degrade the sealed thermoplastic materials by excessive heat and/or pressure. Additionally, some conventional methods introduce further complexity to the manufacture of thermoplastic liners by requiring multiple sequential operations for each hem seal produced.

For some conventional thermoplastic liners, a decrease in material, as well as methods utilized to produce hem seals, can also trigger undesirable visual cues (e.g., that less material is used and therefore the thermoplastic liner must be weak or cheaply made). Regardless of actual material properties, these conventional thermoplastic liners can visually convey material properties indicative of low durability and strength.

BRIEF SUMMARY

One or more implementations of the present disclosure solve one or more problems in the art with multi-film thermoplastic structures including hem seals comprised of continuous contact areas between adjacent films. The contact areas comprise areas in which at least first and second thermoplastic films of the multi-film thermoplastic structure are in intimate contact. The hem seal comprised of continuous contact seals can provide improved material properties (e.g., increased seal strength, reduced film damage at the seal, improved aesthetic) relative to conventional types of hem seals. Additionally, the implementation of hem seals comprised of continuous contact areas can streamline the manufacturing process as the hem seals can be formed by simultaneous application of heat and pressure. Thus, by including hem seals comprised of continuous contact areas, the disclosed implementations can provide for increased strength and quality of multi-film thermoplastic bags, as well as increased efficiency and reduced costs of production.

In one or more implementations, a thermoplastic bag comprises a first sidewall and an opposing second side wall of a thermoplastic material. The first and second sidewalls are connected at a bottom fold and at opposing first and second side edges. A top opening is formed by the first and second sidewalls opposite the bottom fold. The top opening comprises a first top edge of the first sidewall folded over and secured by a first hem seal to form a first hem channel. In one or more implementations, the hem seal extends between the first and second side edges of the first sidewall with a substantially uniform width on a first face of the first sidewall and extends between the first and second side edges of the first sidewall with a variable width on a second face of the first sidewall opposite the first face. In one or more embodiments, the first hem seal comprises a continuous contact area as described in greater detail herein.

Additionally, an implementation of a multi-layer thermoplastic bag includes an outer first thermoplastic bag comprising first and second opposing sidewalls joined together along a first side edge, an opposite second side edge, an open first top edge, and a closed first bottom edge. An inner second thermoplastic bag is positioned within the first thermoplastic bag, the second thermoplastic bag comprising third and fourth opposing sidewalls joined together along a third side edge, an opposite fourth side edge, an open second top edge, and a closed second bottom edge. In some implementations, the open first top edge and the open second top edge folded over and secured by a hem seal to form a hem channel. The hem seal extends between the first and second side edges with a substantially uniform width on an outside face of the multi-layer thermoplastic bag. The hem seal comprises a lamination gradient such that a lamination strength of the hem seal decreases in a direction extending away from a central longitudinal axis of the hem seal. In one or more embodiments, the hem seal comprises a continuous contact area as described in greater detail herein.

In addition to the foregoing, a method for making a multi-film thermoplastic bag involves folding a first thermoplastic film and a second thermoplastic film over at a top edge to form a first hem channel. At least a portion of the first thermoplastic film and the second thermoplastic film extend from the first hem channel to form a first hem skirt. The method also includes passing the first thermoplastic film and the second thermoplastic film between a first set of heated contact rollers. Passing the first thermoplastic film and the second thermoplastic film between the first set of heated contact rollers creates a continuous contact area between a flat portion of the first thermoplastic film, a flat portion of the second thermoplastic film, and the first hem skirt to form a first hem seal securing the first hem channel. The continuous contact area (i.e., the hem seal) extends between first and second side edges of the first and second thermoplastic films with a substantially uniform width on an outside face of the multi-film thermoplastic bag and with a variable width on an inside face of the multi-film thermoplastic bag.

In some implementations, the first set of heated contact rollers also forms (or a second set of heated contact rollers forms) a pattern of contact areas between a flat portion of the first thermoplastic film, a flat portion of the second thermoplastic film, and the first hem skirt, the one or more contact areas extending from the first hem channel over the first hem skirt and toward bottom edges of the first thermoplastic film and the second thermoplastic film. The contact areas are configured to separate before the flat portion of the first thermoplastic film or the flat portion of the second thermoplastic film fail when subjected to peel forces. The method further includes forming the first and second thermoplastic films into a bag.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 1A-1C show partial side cross-sectional views of films having varying numbers of layers according to one or more implementations of the present disclosure;

FIG. 2 shows a partial side cross-sectional view of a multi-film thermoplastic structure having contact areas between first and second thermoplastic films according to one or more implementations of the present disclosure;

DETAILED DESCRIPTION

Figure 3A:
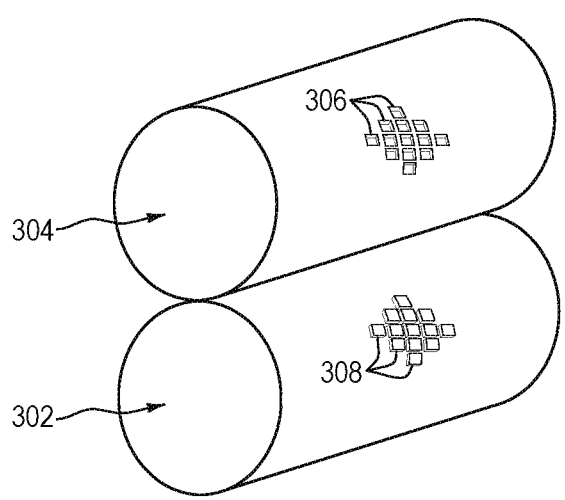
FIG. 3A shows a set of contact rollers for forming contact areas according to one or more implementations of the present disclosure.

One or more implementations of the present disclosure include apparatus and methods for creating multi-film thermoplastic film structures or bags with hem seals comprised of continuous contact areas. In particular, one or more implementations include a multi-film thermoplastic bag having a hem seal comprised of a continuous contact area, where the continuous contact area comprises a portion of the films of the thermoplastic bag that are in intimate contact with one another. In one or more implementations, the continuous contact area of the hem seal comprises a substantially uniform width as the hem seal extends between opposing side edges on an outside face of the thermoplastic bag and a variable width as the hem seal extends across an inside face of the thermoplastic bag. Along with providing a substantially uniform appearance on an outside face of the thermoplastic bag, the continuous contact area provides the bag with a stronger and/or more rigid feel—thus, giving a tactile cue that the bag is less likely to rip, tear, or puncture at or near the hem seal when handled.

Specifically, by forming hem seals that are contact areas, one or more implementations create a peelable seal in the machine direction that provides a gradient of lamination in the transverse direction. In other words, a contact-area based hem seal (e.g., a hem seal formed from one or more contact areas) in accordance with one or more implementations comprises a lamination gradient such that a lamination strength of the hem seal decreases in a direction extending away from a central longitudinal axis of the hem seal toward the edges of the hem seal.

In addition to the foregoing, despite having a lamination gradient, one or more implementations of a contact-area based hem seal include even edges on at least one side of the bag. This contrasts with conventional hot air seals that produce uneven edges on both sides of the bag. The even edged contact-area based hem seal provides a cleaner look and is a signal of quality to consumers. Indeed, a width of the contact-area based hem seal is more consistent than a hot air seal both across the machine direction of the bag and between different bags. Along related lines, the contact-area based hem seal can include a wider seal with more consistent width than conventional hot air seals. In particular, the contact-area based hem seal can include a defined transition in the transverse direction from the seal to a non-sealed area on the pattern side of the bag.

As mentioned, contact-area based hem seals in accordance with one or more implementations can include greater strength properties than conventional hem seals. For example, in one or more implementations, the contact-area based hem seals have fewer air voids between the layers of film in the hem seal due to a higher-pressure being used during formation. Indeed, in one or more implementations, the contact-area based hem seals include no visible (e.g., to the human eye) air voids. Additionally, the contact-area based hem seals can include lower seal thickness than film thickness and a higher density of films in the hem seal. Along related lines, the transverse sides of the contact-area based hem seals are less heat-damaged due to heat being applied only in the rotary nip and not via a wider stream of hot air as done with conventional hot air seals.

One or more implementations of contact-area based hem seals include higher and more consistent film strength over the seal due to reduced film damage due to higher-pressure and lower temperatures used to form the contact-area based hem seals compared to traditional hem sealing process. In addition to having a lamination gradient across the transverse direction width of the contact-area based hem seals, the contact-area based hem seals can have a higher transverse direction tensile on one side of the bag. In particular, the side of the bag contacted by a rubber contact roller can result in greater transverse direction tensile strength than a side of the bag contacted by a metal contact roller.

In addition to providing better hem seals with one or more of the foregoing benefits, one or more implementations are also able to produce such contact-area based hem seals with greater process efficiency than traditional hem sealing processes. For example, one or more implementations include reduced manufacturing complexity by having a single transformation versus the multiple transformations (hot air+nip wheel) in a traditional hot air hem sealing processes. Furthermore, the contact-area based hem sealing process of one or more implementations can more readily accept variation in gauge due to tooling radius. Also, contact-area based hem sealing process of one or more implementations has reduced sensitivity of seal quality to increased manufacturing line speed versus the traditional hot air hem sealing processes.

In one or more implementations, contact areas of a multi-film thermoplastic bag, including the continuous contact area of a contact-area based hem seal, can bring surfaces of thermoplastic film layers into intimate contact. In some implementations, the thermoplastic film layers brought into intimate contact include an outside portion of a folded sidewall of a single layer thermoplastic bag and an inside portion of the same folded sidewall, wherein the sidewall is folded over and secured by the continuous contact area of the hem seal to form a hem channel. In alternative implementations, the thermoplastic film layers brought into intimate contact include one or more layers of a first outer thermoplastic bag and one or more layers of a second inner thermoplastic bag, the layers being folded over together and secured by the continuous contact area of the hem seal to form a hem channel.

Bringing the thermoplastic film layers into direct contact can cause an appearance change. In particular, in one or more implementations, when viewed from an outside of the multi-film thermoplastic bag, the contact areas comprise a different color than the portions of the thermoplastic film layers not in intimate contact with one another (e.g., separated by an air gap or space).

Moreover, when films of a multi-film thermoplastic bag have different appearances, due to the inclusion of a pigment or other coloring agent, the contact areas cause the appearance of areas of visual contrast in adjacent films. For example, in a two-film thermoplastic bag where the first thermoplastic film is a light color and the second thermoplastic film is a dark color, intimate contact between the two films causes a wetting effect in an area of the first thermoplastic film. For instance, the intimate contact removes air from between portions of the two films such that the color of the second thermoplastic film shows through the first thermoplastic film. Thus, in this example the contact areas, including the continuous contact area of the hem seal, cause a dark area to appear in the lighter first thermoplastic film. Thus, the contact areas can create intimate contact between a portion of a first film and a portion of a second film causing the area of intimate contact to take on the visual characteristics of one of the films. Alternatively, the area of the intimate contact can take on a visual appearance that is a blending of the first and second films, or an appearance that is different from both the first and second films.

One will appreciate in light of the disclosure here that portions of the films of a multi-film thermoplastic bag can be brought into intimate contact with each other using various techniques. In particular, one or more implementations involve utilizing heat and pressure on the films of the multi-film thermoplastic bag to bring the films together and create the contact areas. Furthermore, one or more implementations involve controlling the amount of heat and pressure to tailor the properties of the areas forming the contact areas. For example, in one or more implementations enough heat and pressure are applied so as to bring the films into intimate contact but not so much as to degrade the strength or otherwise weakening the films. For example, in one or more implementations a strength of the films in the contact areas is not substantially weakened. More particularly, in one or more implementations a transverse-direction tensile strength of the films with contact areas is not significantly lower than the areas of the films not including the contact areas. Still further, in one or more implementations, a penetration resistance strength (e.g., as measured by a slow rate penetration resistance test) of the films with contact areas is not significantly lower than the areas of the films not including the contact areas.

Additionally, one or more implementations involve controlling the amount of heat and pressure to tailor the properties of the films forming the contact areas such that the films are in intimate contact but unbonded or lightly bonded. For example, one or more implementations provide for forming contact areas between adjacent films of a multi-film thermoplastic bag that are relatively light such that forces acting on the multi-film bag are first absorbed by breaking the bond(s) of the contact areas rather than, or prior to, tearing or otherwise causing the failure of any of the films of the multi-film bag when subjected to peel forces within a given range. Such implementations can provide an overall thinner film employing a reduced amount of raw material that nonetheless has maintained or increased strength parameters. Alternatively, such implementations can use a given amount of raw material and provide a film with increased strength parameters. For example, films including contact areas can have an increased resistance to tear propagation. In particular, a tear propagating across the film can be stopped or otherwise prohibited when running into a contact area.

In particular, the contact areas between adjacent layers of multi-film bags in accordance with one or more implementations can act to first absorb forces via breaking prior to allowing those same forces to cause failure of the individual films of the multi-film bag when subjected to peel forces. Such action can provide increased strength to the multi-film thermoplastic bag. In one or more implementations, the contact areas include a bond strength that is less than a weakest tear resistance of each of the individual films so as to cause the bonds of the contact areas to fail prior to failure of the films when subjected to peel forces within a given range. Indeed, one or more implementations include contact areas, such as a hem seal comprised of a continuous contact area, that release between films of a multi-film thermoplastic bag prior to any localized tearing of the films of the multi-film thermoplastic bag.

Thus, in one or more implementations, the contact areas of a multi-film thermoplastic bag, including the continuous contact area of a hem seal, can fail before either of the individual layers undergoes molecular-level deformation. For example, an applied strain can pull the contact areas apart prior to any molecular-level deformation (stretching, tearing, puncturing, etc.) of the individual film layers. In other words, the contact areas can provide less resistive force to an applied strain than molecular-level deformation of individual films of the multi-film bag. Such a configuration of contact areas can provide increased strength properties to the multi-film thermoplastic bag as compared to a monolayer film of equal thickness or a multi-film bag in which the plurality of layers are tightly bonded together (e.g., coextruded). As such, hem seals comprised of continuous contact areas are able to provide strength benefits, among other advantages.

In one or more alternative implementations, the contact areas of a multi-film thermoplastic bag are formed with heat and pressure so as to create a permanent bond between the first and second thermoplastic layers. In such implementations, the bond between the first and second thermoplastic layers created by the contact areas can be inseparable without causing failure of one or more of the first and second thermoplastic films. Contact areas with permanent bonds can ensure that hem seals formed by continuous contact areas do not change visible or other characteristics during use of the thermoplastic bag or structure.

Various implementations of multi-layer thermoplastic structures, such as multi-layer thermoplastic bags, with hem seals comprised of contact areas provide various advantages over conventional structures and techniques. For example, the contact areas can provide a contrast (as described above) that provides enhanced visibility of hem seals compared to conventional methods of securing hem channels. In particular, hem seals comprised of contact areas in accordance with one or more implementations are configured to have higher density and more solidly defined width (i.e., substantially uniform width) as the hem seal extends between sides of the thermoplastic bag.

As used herein, the terms "lamination," "laminate," and "laminated film," refer to the process and resulting product made by bonding together two or more layers of film or other material. The term "bonding," when used in reference to bonding of multiple layers of a multi-film bag, may be used interchangeably with "lamination" of the layers. According to one or more implementations, adjacent films of a multi-film bag are laminated or bonded to one another.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, heat bonding, and the like) two or more separately made film articles to one another so as to form a multi-film bag. As a noun, "laminate" means a product produced by the affixing or adhering just described.

In one or more implementations, the contact areas between films of a multi-film bag may be continuous. As used herein, a "continuous contact area" refers to a contact area that is uninterrupted as the contact area extends across a thermoplastic structure. In one or more implementations, a hem seal comprised of a continuous contact area comprises a substantially uniform width on a first face of a thermoplastic film and a variable width on a second face of the thermoplastic film. As used herein, a hem seal with a "substantially uniform" width refers to a hem seal having a distinct, uninterrupted edges on either side of the width of the hem seal as the hem seal extends between opposing sides of a thermoplastic bag. In other words, a hem seal with a substantially uniform width includes little to no distortion in the edges of the hem seal. In contrast, as used herein, a hem seal with a "variable" width refers to a hem seal having a width that varies as the hem seal extends between opposing sides of a thermoplastic bag. In some implementations, for example, a hem seal with a variable width includes edges along the length of the hem seal that are indistinct, discontinuous or at least partially distorted relative to the substantially uniform width of the hem seal on the opposite face of the thermoplastic bag.

In one or more implementations, at least some of the contact areas between films of a multi-film bag may be in a discrete or non-continuous pattern (i.e., discontinuous or partially discontinuous). As used herein, a "discrete pattern" of contact areas refers to a non-repeating pattern of pattern elements in the machine direction, in the transverse direction, or in an angled direction.

In one or more implementations, the contact areas between films of a multi-film bag may be in a partially discontinuous pattern. As used herein, a "partially discontinuous" pattern of contact areas refers to pattern elements that are substantially continuous in the machine direction or in the transverse direction, but not continuous in the other of the machine direction or the transverse direction. Alternately, a partially discontinuous pattern of contact areas refers to pattern elements that are substantially continuous in the width of the article but not continuous in the height of the article, or substantially continuous in the height of the article but not continuous in the width of the article. Alternatively, a partially discontinuous pattern of contact areas refers to pattern elements that are substantially continuous for a width and height that is less than the width and height of the article. More particularly, a partially discontinuous pattern of contact areas refers to repeating pattern elements broken up by repeating separated areas in either the machine direction, the transverse direction, or both. Both partially discontinuous and discontinuous patterns are types of non-continuous heated pressure bonding (i.e., bonding that is not complete and continuous between two surfaces).

One or more implementations involve bringing pigmented, lightly pigmented, and/or substantially un-pigmented thermoplastic films into intimate contact. As used herein, the term "substantially un-pigmented" refers to a thermoplastic ply or plies that are substantially free of a significant amount of pigment such that the ply is substantially transparent or translucent. For example, a "substantially un-pigmented" film can have a pigment concentration (i.e., percent of total composition of the film) that is between 0% by weight and 2% by weight. In some embodiments, a "substantially un-pigmented" film can have a pigment concentration between about 0% by weight and about 1% by weight. In further embodiments, a "substantially un-pigmented" film can have a pigment concentration between about 0% by weight and about 0.75% by weight. A substantially un-pigmented film can have a transparent or translucent appearance.

As used herein, the term "lightly pigmented" refers to a thermoplastic ply or plies that are pigmented such that, when placed into intimate contact with a pigmented film, an unexpected appearance is produced. For example, the unexpected appearance can be a "wetting" of a color of the pigmented film through the lightly pigmented film. Alternately, the unexpected appearance may be an effect that differs from an appearance (e.g., colors) of the individual films. If a film has too much pigment, when placed into intimate contact with another pigmented film, an unexpected appearance will not be produced. The amount of pigment in a lightly pigmented film that will produce the unexpected appearance can be dictated by the thickness of the film.

A pigmented film, in one or more implementations, can comprise a lightly pigmented film or a film with a greater percentage of pigment than a lightly pigmented film. As mentioned above, in one or more embodiments, a first thermoplastic film is substantially un-pigmented or lightly pigmented and a second thermoplastic film is pigmented. Thus, in one or more embodiments, the second thermoplastic layer has a greater percentage of pigment than the first thermoplastic layer. Alternatively, the first and second thermoplastic layers have the same percentage of pigment, but the first thermoplastic layer comprises a lighter pigment than a pigment of the second thermoplastic layer. In still further implementations, the substantially un-pigmented or lightly pigmented thermoplastic film comprises a greater percent weight of pigment than the pigmented thermoplastic film. Nonetheless, in such implementations, the un-pigmented or lightly pigmented thermoplastic film can be more transparent or translucent film than the pigmented thermoplastic film.

As used herein, the term "pigment or pigments" are solids of an organic and inorganic nature which are defined as such when they are used within a system and incorporated into the thermoplastic film, absorbing part of the light and reflecting the complementary part thereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, White Lead, Lithopone, Clay, Magnesium Silicate, Barytes (BaSO4), and Calcium Carbonate (CaCO3).

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene-based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and bags that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-film bag may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

As described above, a multi-film thermoplastic bag includes a plurality of thermoplastic films. Each individual film may itself include a single layer or multiple layers. In other words, the individual films of the multi-film bag may each themselves comprise a plurality of layers. Such layers may be significantly more tightly bonded together than the bonding (if any) of the contact areas. Both tight and relatively weak bonding can be accomplished by joining layers by mechanical pressure, joining layers with heat, joining with heat and pressure, joining layers with adhesives, spread coating, extrusion coating, ultrasonic bonding, static bonding, cohesive bonding and combinations thereof. Adjacent sub-layers of an individual film may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

A thermoplastic film can may include a one, two, three, or more layers of thermoplastic material. FIGS. 1A-1C are partial cross-sectional views of films that can be included in a multi-film thermoplastic bag of one or more implementations. In some implementations, the film may include a single layer film 102a, as shown in FIG. 1A, comprising a single first layer 110. In other embodiments, the film can comprise a two-layer film 102b as shown in FIG. 1B, including the first layer 110 and a second layer 112. The first and second layers 110, 112 can be coextruded. In such implementations, the first and second layers 110, 112 may optionally include different grades of thermoplastic material and/or include different additives, including polymer additives and/or pigments. In yet other implementations, a film be a tri-layer film 102c, as shown in FIG. 1C, including the first layer 110, the second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

In one example, the film 102a can comprise a 0.5 mil, 0.920 density LLDPE, colored film containing 4.8% pigment that appears a first color. In an alternative embodiment, the film 102a can comprise a 0.5 mil, 0.920 density LLDPE, un-pigmented film that appears clear or substantially clear. In still further embodiments, the film 102a can comprise a 0.5 mil, 0.920 density LLDPE, pigmented film that appears a second color.

In at least one implementation, such as shown in FIG. 1C, a multilayered film 102c can include co-extruded layers. For example, the film 102c can include a three-layer B:A:B structure, where the ratio of layers can be 20:60:20. The exterior B layers (i.e., the first layer 110, and the third layer 114) can comprise a mixture of hexene LLDPE of density 0.918, and metallocene LLDPE of density 0.920. The interior A core layer (i.e., the second layer 112) can comprise a mixture of hexene LLDPE of density 0.918, butene LLDPE of density 0.918, reclaimed resin from trash bags. Additionally, the A core layer (i.e., the second layer 112) can include a pigment. For example, the A core layer can include a colorant in an amount between about 0.1 percent and about 6%.

In another example, the film 102c is a coextruded three-layer B:A:B structure where the ratio of layers is 15:70:15.

The B:A:B structure can also optionally have a ratio of B:A that is greater than 20:60 or less than 15:70. In one or more implementations, the LLDPE can comprise greater than 50% of the overall thermoplastic material in the film 102c.

In another example, the film 102c is a coextruded three-layer C:A:B structure where the ratio of layers is 20:60:20. The C layer (i.e., the third layer 114) can comprise a LLDPE material with a first colorant (e.g., black). The B layer (i.e., the second layer 112) can also comprise a LLDPE material with a second colorant (e.g., white). The LLDPE material can have a MI of 1.0 and density of 0.920 g/cm3. The A core layer (i.e., the first layer 110) can comprise similar materials to any of the core layer describe above. The A core layer can comprise a black colorant, a white colorant, or can be clear.

In still further embodiments, a film can comprise any number of co-extruded layers. More particularly in one or more embodiments, a film can comprise any number of co-extruded layers so long as the A and B layers do not alternate such that the A layers are on one side and the B layers are on the other side. In still further embodiments, a film can comprise one or more co-extruded layers between the A and B layers. For example, the film can comprise clear or transparent layers between the A and B layer(s). In still further embodiments, a film can comprise intermittent layers of different colors in addition to the A and B layer(s).

FIG. 2 illustrates one example of a multi-film thermoplastic structure 202 including contact areas 210 between a first thermoplastic film 204 and a second thermoplastic film 206. Each of the thermoplastic films 204, 206 can comprise any of the thermoplastic films 102a-102c described above or a film with more than three layers. FIG. 2 illustrates that the first thermoplastic film 204 of the multi-film thermoplastic structure 202 abutted directly against the second thermoplastic film 206 at contact areas 210. In particular, the multi-film thermoplastic structure 202 can include contact areas 210 and separated areas 208. The contact areas 210 remove the air and/or space between the thermoplastic films 204, 206.

As shown by FIG. 2, the contact areas 210 can comprise areas in which the first thermoplastic film 204 is in direct, or intimate, contact with the second thermoplastic film 206. As such, the contact areas 210 can create regions that are visually distinct from the rest of the multi-film thermoplastic structure 202 (at least when viewing the major surface of the first thermoplastic film 204). In other words, because the first thermoplastic film 204 is directly abutted against the second thermoplastic film 206, the contact areas 210 can have the color or appearance of the second thermoplastic film 206 or another color or appearance that differs from the separated portions of the first thermoplastic film 204.

For example, in one or more implementations, the second thermoplastic film 206 can comprise a pigmented film and have a black appearance while the first thermoplastic film 204 is substantially un-pigmented or lightly pigmented and have a clear, transparent, or cloudy appearance. When combined to form a multi-film thermoplastic structure 202 in accordance the principles described herein, the first thermoplastic film 204 as part of the multi-film thermoplastic structure 202 can have a color or appearance that differs from the color of the first thermoplastic film 204. For example, the first thermoplastic film 204 can have a metallic, silvery metallic or light grey color rather than a black appearance or color as would be expected (i.e., due to viewing the second thermoplastic film 206 through a clear or transparent film). The regions or areas of the two films in intimate contact with each other create contact areas that have a color or appearance that differs from the color or appearance of the first thermoplastic film 204. For example, the contact areas 210 can have the color or appearance of the second thermoplastic film 206 (e.g., black).

In one or more alternative implementations, the first thermoplastic film 204 comprises a light colorant while the second thermoplastic film 206 comprises a dark colorant. As used herein, a light colorant is a color with a brightness closer to the brightness of white than the brightness of black. As used herein, a dark colorant is a color with a brightness closer to the brightness of black than the brightness of white. In one or more embodiments, the first thermoplastic film 204 has a concentration of light colorant between about 1% by mass and about 15% by mass. More particularly, in one or more embodiments, the first thermoplastic film 204 has a concentration of light colorant between about 2% by mass and about 12% by mass. In still further embodiments, the first thermoplastic film 204 has a concentration of light colorant between about 5% by mass and about 10% by mass.

Still further, the second thermoplastic film 206 has a concentration of dark colorant between about 1% by mass and about 15% by mass. More particularly, in one or more embodiments, the second thermoplastic film 206 has a concentration of dark colorant between about 2% by mass and about 12% by mass. In still further embodiments, the second thermoplastic film 206 has a concentration of dark colorant between about 5% by mass and about 10% by mass.

The white colored first thermoplastic film 204, when part of the multi-film thermoplastic structure 202 can have a gray appearance. The foregoing described color change may give the appearance of a third color without requiring the actual colorant mixture of the third color to be within the multi-film thermoplastic structure 202. In other words, the bag can be devoid of a gray pigment. For example, it may allow a film having a viewable black layer and a viewable white layer to have (i.e., mimic) a gray appearance (often a consumer preferred color). Furthermore, the foregoing described color change may allow the film to mimic a gray appearance without significantly increasing and/or reducing a transparency (i.e., light transmittance) of the film. In other words, the foregoing described color change may allow the multi-film thermoplastic structure 202 to mimic a gray appearance without detrimentally affecting an appearance of quality of the film.

Thus, the contact areas have a color or appearance that differs from the color or appearance of the first thermoplastic film 204. For example, the contact areas 210 can have the color or appearance of the second thermoplastic film 206 (e.g., black) or another color. One will appreciate in light of the disclosure herein that black and white are used as exemplary colors for ease in explanation. In alternative embodiments, the films can comprise other color combinations such as white and blue, yellow and blue, red and blue, etc.

Irrespective of the specific colors of the first and second thermoplastic films, the contact areas 210 can have a substantial change in appearance compared to the separated areas 208 when viewed from the first thermoplastic film side of the multi-film thermoplastic structure 202. In some embodiments, for example, when using the LAB color space, a represents a measurement of green and magenta values, b represents a measurement of blue and yellow values, and L represents a measurement of lightness (i.e., white and back values). In some embodiments, the change in appearance of the contact areas 210 comprises a color change in which the L value decreases by at least five points. In some embodiments, the change in appearance of the contact areas 210 comprises a color change in which the L value decreases between five and forty points, between five and thirty points, or between five and twenty points.

For example, the change in appearance of the contact areas 210 may include a perceivable change of color from gray to black. In additional embodiments, the change in appearance of the contact areas 210 may include a perceivable change of color from a first relatively lighter color to a second darker color. For example, the change in appearance may include perceivable change of color from a first light gray to a second dark gray. In other implementations, the change in appearance may include perceivable change of color from a first lighter version of any color to a second darker version of the same color.

As another example, it may allow a film having a viewable blue layer (with a back yellow layer) to have (i.e., mimic) a green appearance. Furthermore, the foregoing described color change may allow the film to mimic a green appearance without significantly increasing and/or reducing a transparency (i.e., light transmittance) of the film. In other words, the foregoing described color change may allow the film to mimic a green appearance without detrimentally affecting an appearance of quality of the film. As a result of the foregoing, the multi-layer film of the present disclosure may provide a multi-layer film having a particular appearance (e.g., a green appearance) while reducing costs. One will appreciate that other color combination in addition to white/black producing grey and yellow/blue producing green are possible and the foregoing are provided by way of example and not limitation.

FIG. 2 further illustrates that the contact areas 210 optionally secure the thermoplastic films 204, 206 of the multi-film thermoplastic structure 202 such that the thickness of the thermoplastic films 204, 206 is substantially unchanged at each of the contact areas 210. In other words, each of the first and second thermoplastic films 204, 206 can have a substantially uniform gauge (e.g., are substantially flat). In other words, the gauge of the first and second thermoplastic films 204, 206 in the separated areas 208 is substantially the same as the gauge of the first and second thermoplastic films 204, 206 in the contact areas 210. This is in contrast to ring rolled, SELF'ed, conventional embossing, or other processes that can bond film layers together, while also deforming portions of the films. As mentioned above, the heat, pressure, and depth of engagement during creation of the contact areas can control to what extent, if any, the thermoplastic films are deformed when forming the contact areas 210. In one or more implementations, the process of forming the contact areas 210 does not deform, or does not substantially deform, the thermoplastic films such that they are flat, or appear flat, despite the presence of contact areas 210. In alternative implementations, the portions of the first and second thermoplastic films comprising the contact areas 210 create an increase or decrease in the gauge or loft of the multi-film thermoplastic structure 202.

In one or more implementations, the creation of the contact areas 210 does not weaken the first and second thermoplastic films 204, 206. For example, in one or more implementations, film strength in the portions of the first and second thermoplastic films 204, 206 comprising the contact areas 210 is not significantly lower than the portions of the first and second thermoplastic films 204, 206 in the areas 208 of separation. In particular, in one or more implementations, film in the contact areas 210 have transverse direction tensile strength that is the same as the film in the separated areas 208.

Moreover, the creation of the contact areas 210 can create other tactile features in the multi-film thermoplastic structure 202. For example, regions of the multi-film thermoplastic structure 202 including the contact areas 210 can have an increased rigidity over other regions of the multi-film thermoplastic structure 202 without contact areas. In some implementations, the contact areas 210 may increase the rigidity of the multi-film thermoplastic structure 202 by a factor of one. In other implementations, the contact areas 210 may increase the rigidity of the multi-film thermoplastic structure 202 by as much as a factor of three. Alternatively, the contact areas 210 may not increase the rigidity of the multi-film thermoplastic structure 202 at all.

FIGS. 3A-3D illustrate various implementations of contact rollers for forming contact areas. For example, as shown in FIG. 3A, the contact rollers include a punch roll 302 and a cooperating die roll 304. Each of the punch roll 302 and the die roll 304 may be cylindrical and may have longitudinal axes that are parallel to each other. The punch roll 302 and the die roll 304 may define a passage or tooling nip therebetween through which film materials may pass through to form the contact areas. As shown in FIG. 3A, the punch roll 302 is provided with punch elements 308 that extend outward from a surface of the punch roll 302. The die roll 304 is provided with corresponding die recesses 306 that extend into the surface of the die roll 304 for cooperating with, or receiving, the punch elements 308.

Figure 3B:
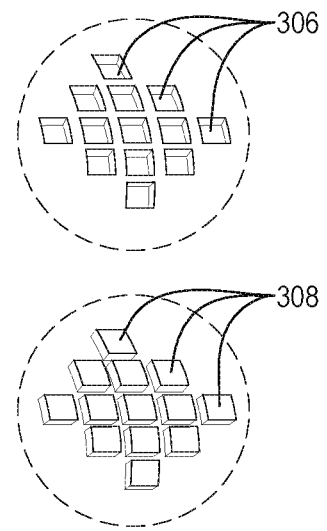
FIG. 3B shows a close-up view of the set of contact rollers of FIG. 3A.

As illustrated in the enlargement shown in FIG. 3B, the punch elements 308 may each have a plurality of punch elements for cooperating with corresponding die elements in the die recesses 306. The cooperating engagement of the punch elements with the die elements, with one or more thermoplastic films therebetween, forms contact areas by pressing thermoplastic films together.

Figure 3C:
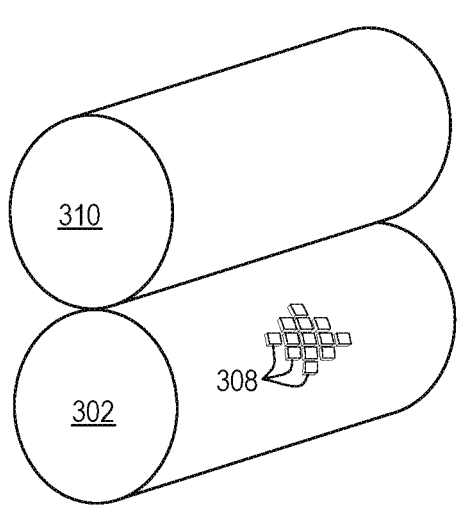
FIG. 3C shows a perspective view of another set of contact rollers for forming contact areas according to one or more implementations of the present disclosure.

FIG. 3C illustrates an alternative set of contact rollers comprise a punch roll 302 and a press roll 310. The press roll 310 may comprise a conformable surface for conforming to the punch elements, or other surface configuration of the punch roll 302. In still further embodiments, the press roll can comprise a rubber roll or roll formed form another conformable material.

Figure 3D:
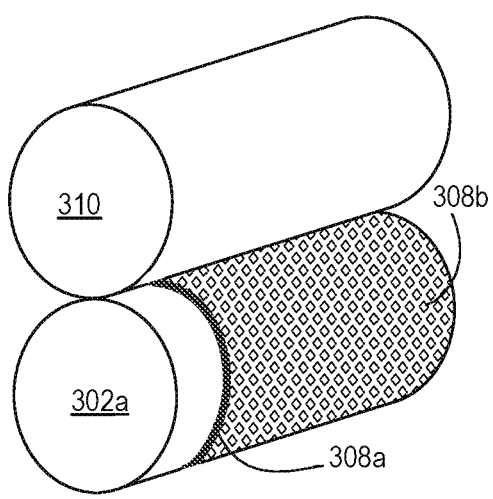
FIG. 3D shows a perspective view of a set of contact rollers for forming contact areas including a pattern of contact areas and a hem seal comprised of a continuous contact area according to one or more implementations of the present disclosure.

FIG. 3D illustrates yet another implementation of contact rollers including a punch roll 302a and a press roll 310. More particularly, the contact rollers of FIG. 3D are sized and configured to create contact areas arranged in a pattern extending below a hem seal comprised of a continuous contact area in multi-film thermoplastic structures (e.g., thermoplastic bags). In particular, the punch roll 302a includes punch element 308a sized and configured to create a continuous contact area forming a hem seal in a multi-film thermoplastic structure. The punch roll 302a further includes punch elements 308b sized and configured to create a pattern of contact areas (e.g., a plurality of diamond shaped contact areas) extending below the hem seal formed by the punch element 308a.

In some implementations, as a multi-film thermoplastic structure comprising a darker pigmented thermoplastic film and a lighter or non-pigmented thermoplastic film passes between the contact rollers 302a, 310, the punch elements 308a, 308b of the punch roll 302a presses portions of the thermoplastic films together against the press roll 310. In one or more implementations the punch roller 302a is metallic and heated. The heat and pressure supplied by the contact rollers 302a, 310 form contact areas in the multi-film thermoplastic structure have the shape of the punch elements 308a, 308b of the punch roll 302a. Further, in some implementations, the heat and pressure can result in the presence of zero air voids between thermoplastic layers in the formed contact areas.

One of the rolls may be formed from a relatively hard material (e.g., steel, aluminum, ebonite or other suitable hard material), and the other may be formed from a softer material (e.g., rubber or other suitable softer material). For example, the punch roll 302/302a and the cooperating die roll 304 or press roll 310 may include a steel-to-rubber interface. In alternative embodiments, both the punch roll 302/302a and the die/press roll 304/310 may be formed from the relatively hard material (e.g., steel). Put another way, the punch roll 302/302a and the die/press roll 304/310 may include a steel-to-steel interface. Regardless of whether the punch roll 302/302a and the die/press roll 304/310 include a steel-to-rubber interface or a steel-to-steel interface, in one or more implementations, one or more of the contact rollers may include an electrically heated roll (e.g., means of heating). For example, in one embodiment, an aluminum punch roll 302 is internally heated by an electric source and a rubber die/press roll 304/310 is unheated. Alternatively, in at least one embodiment, at least one of the punch roll 302/302a and the die/press roll 304/310 may be externally heated (e.g., by directing a heat source at one or more outer portions of the roll). In alternative embodiments, neither of the contact rollers are heated.

The plurality of punch elements may have height of between about 10.0 mils and about 150.0 mils, and the receiving the die elements may have depth of between about 10.0 mils and about 120.0 mils. In at least one implementation, as shown in FIG. 3B, the punch elements and the correlating die elements can include a plurality of evenly spaced squares forming a repeat unit. In alternative implementations, the punch elements and the correlating die elements can include a plurality of evenly spaced chevron patterns. Alternatively, the punch elements and the correlating die elements can include a plurality of random polygon shaped protrusions and a plurality of matching random polygon shaped recesses to form a mosaic of random polygon shaped recesses.

In at least one embodiment, one or both of the contact rollers 302/302a, 304 and/or the press roll 310 (as shown in FIGS. 3A-3D above) are heated to a temperature between 125 degrees and 324 degrees (Fahrenheit) in order to create the contact areas. Additionally, in at least one embodiment, the contact rollers 302/302a, 304 and/or the press roll 310 may create the contact areas by being positioned so as to create a tooling nip (e.g., a passage) where a multi-film thermoplastic structure passing therein experiences pressure within a range of 100-1800 pounds per square inch. Furthermore, the contact rollers 302/302a, 304 and/or the press roll 310 may create the contact areas by spinning at speeds of 500-1200 feet per minute. In one or more embodiments, the contact rollers 302/302a, 304 and/or 310 may operate within these ranges of heat, pressure, and speed while processing a two-layer thermoplastic film, a four-layer thermoplastic film, an eight-layer thermoplastic film, or a multi-film thermoplastic structure with even more layers. In at least one embodiment, one or both of the contact rollers 302/302a, 304 and/or the press roll 310 are pre-heated along the outer perimeter of the contact rollers 302/302a, 304 and/or the press roll 310 to a temperature within the range described above. Additionally, or alternatively, the multi-film thermoplastic structure may be pre-heated prior to passing through the contact rollers 302/302a, 304 and/or the press roll 310.

Figure 4A:
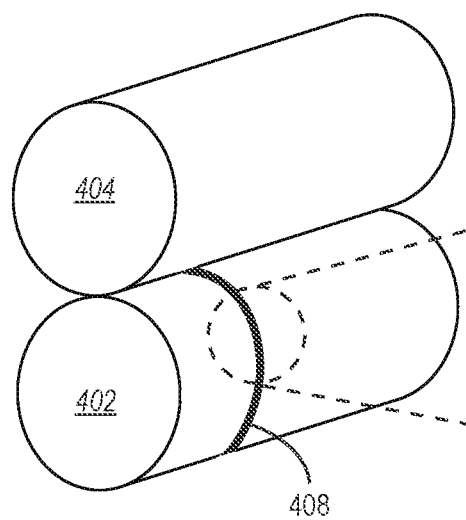
FIG. 4A shows a set of contact rollers for forming a hem seal comprised of a continuous contact area according to one or more implementations of the present disclosure.
Figure 4B:
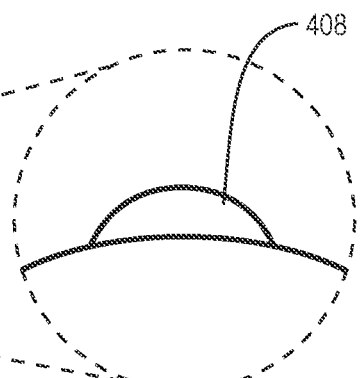
FIG. 4B shows a close-up view of the set of contact rollers of FIG. 4A.
Figure 4C:
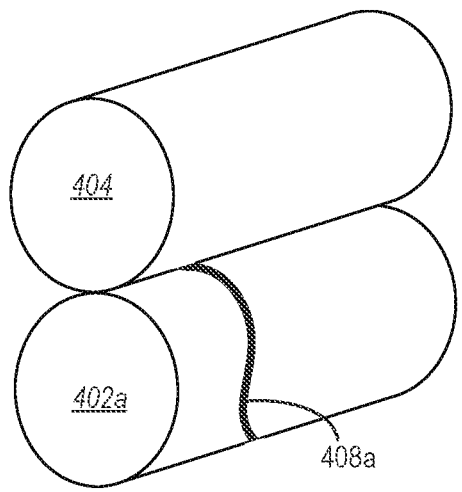
FIG. 4C shows a set of contact rollers for forming a non-linear hem seal comprised of a continuous contact area according to one or more implementations of the present disclosure.

Moreover, FIGS. 4A-4C show additional implementations of contact rollers for forming contact areas in thermoplastic structures. For instance, FIG. 4A illustrates an implementation of contact rollers including a punch roll 402 and a press roll 404. More particularly, the contact roller of FIG. 4A is sized and configured to create a continuous contact area in thermoplastic structures (e.g., thermoplastic bags), whether they be multi-film structures or single-film structures folded over and sealed by the continuous contact area (i.e., hem seal) to form a hem channel. In particular, the punch roll 402 includes punch element 408 sized and configured to create a continuous contact area forming a hem seal in a multi-film thermoplastic structure.

As illustrated in the enlargement shown in FIG. 4B, in one or more implementations, the punch element 408 has a rounded profile (i.e., in a direction of rotation of the punch roll 402). In some implementations, the rounded profile of the punch element 408 imposes a gradient of pressure and or heat across a width of the hem seal. Moreover, variations in hem seal width can be achieved by altering the pressure applied between the punch roll 402 and the press roll 404. Furthermore, adjustments to the gauge of thermoplastic materials pressed between the punch roll 402 the press roll 404 can affect the width of the hem seal, as well as the magnitude of heat applied to subsequent layers in implementations wherein only the press roll 404 is heated. Also, due to the resultant gradient of heat and pressure applied by the curved profile of the punch element 408, a magnitude of material deformation and/or damage gradually decreases between a central longitudinal axis of the hem seal and the outer edges thereof. Similarly, in some implementations, such a gradient produces a lamination strength of and/or a stress concentration induced by the hem seal decreases in a direction extending away from a central longitudinal axis of the hem seal. This is due to the pressure dropping to zero as the punch element 408 disengages the film such that peel force is less at the outer edge of the seal.

While FIG. 4B shows the punch element 408 having a profile of a particular shape, alternative implementations can include a variety of punch element profiles to achieve different strength and/or visual properties within the contact area of the hem seal. For example, a punch element with abrupt edges, such as a square edges, can be implemented to produce a hem seal with a constant profile of heat and pressure across the width of the hem seal.

FIG. 4C illustrates another implementation of contact rollers including a punch roll 402a and a press roll 404. More particularly, the contact roller of FIG. 4C is sized and configured to create a non-linear continuous contact area (e.g., a continuous contact area in a wave or other continuous but non-linear pattern) in thermoplastic structures (e.g., thermoplastic bags), whether they be multi-film structures or single-film structures folded over and sealed by the non-linear continuous contact area (i.e., hem seal) to form a hem channel. In particular, the punch roll 402a includes a non-linear punch element 408a sized and configured to create a non-linear continuous contact area forming a hem seal in a multi-film thermoplastic structure. In alternative implementations, a linear hem seal can be formed by a linear punch element (such as shown in FIG. 4A) with an additional non-linear contact area formed below the linear hem seal to provide additional support to an upper region of the bag.

Figure 4D:
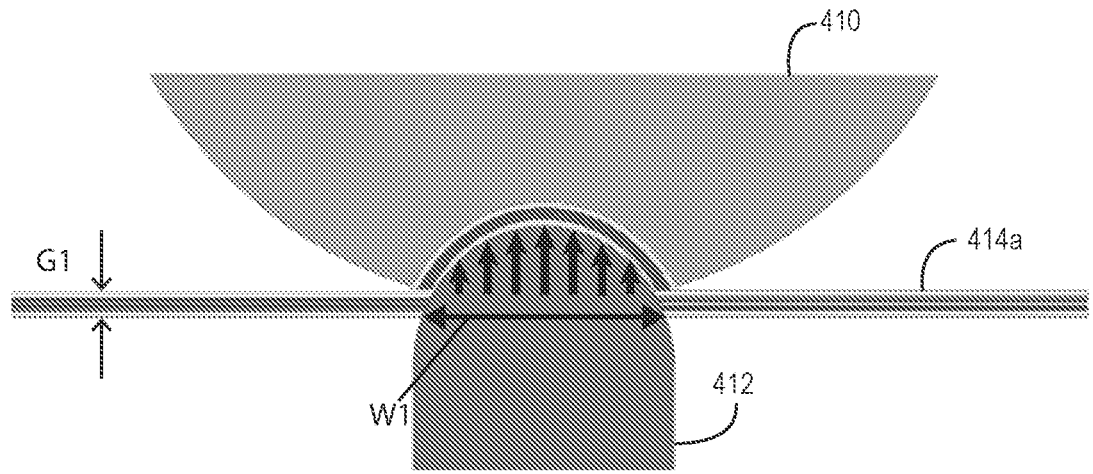
FIGS. 4D-4E show cross-sectional views of contact rollers forming hem seals comprised of continuous contact areas according to one or more implementations of the present disclosure.
Figure 4E:
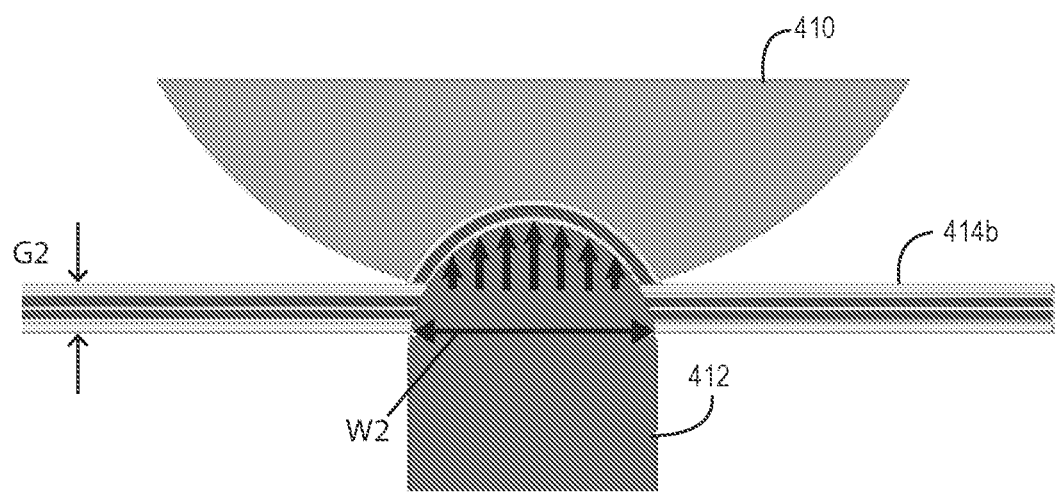

To further illustrate, FIGS. 4D and 4E show a cross-sectional view of contact rollers forming continuous contact areas in two respective layups of thermoplastic material. For instance, FIG. 4D shows a layup 414a of thermoplastic layers pressed between a press roll 410 and a punch element 412 of the punch roll (see, e.g., FIG. 4A). Similarly, FIG. 4E shows a layup 414b pressed between the press roll 410 and the punch element 412. As shown, the layup 414a of FIG. 4D has a lower (thinner) total gauge G1 compared to the total gauge G2 of the layup 414b of FIG. 4E. Consequently, when both layups 414a and 414b are subjected to equal magnitudes of pressure and heat by the method shown, the thicker total gauge G2 of the layup 414b (relative to the total gauge G1 of the layup 414a), a width W2 of the continuous contact area formed in the layup 414b comprises a lower (narrower) width relative to a width W1 of the continuous contact area formed in the layup 414a. Indeed, according to one or more implementations, a width of a hem seal comprised of a continuous contact area can be adjusted by one or more of: modifying the size and/or profile of the punch element 412, increasing the heat and/or pressure applied thereby, or adjusting the total gauge of the layup in which the hem seal is formed.

Figure 4F:
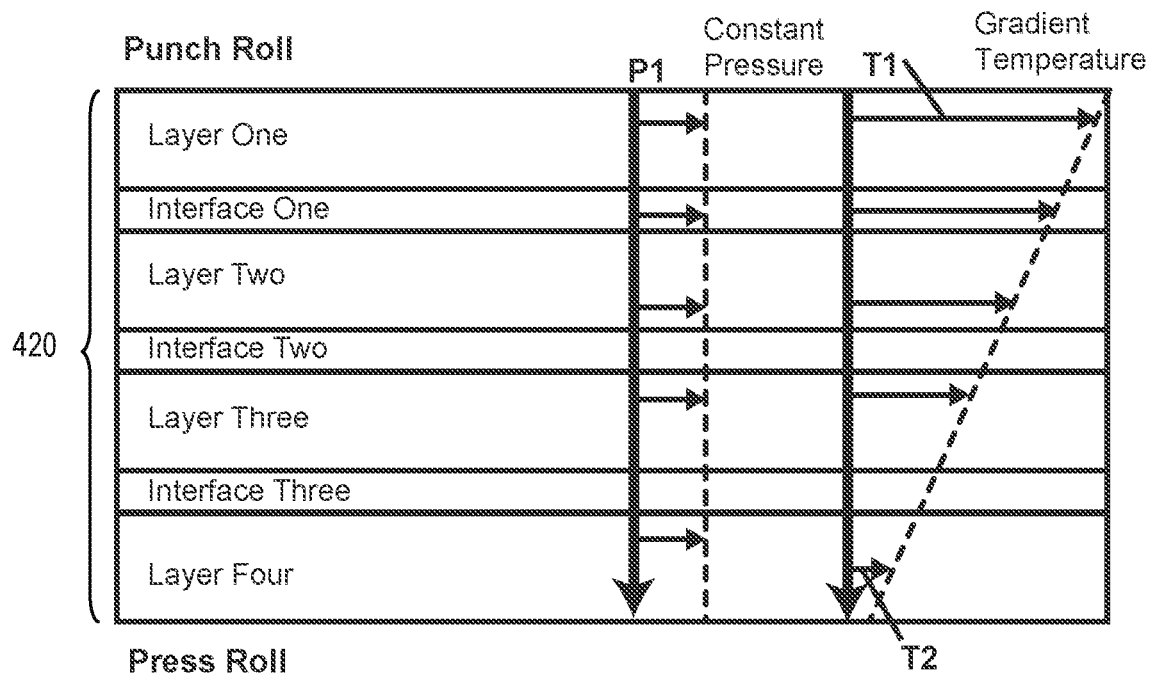
FIG. 4F shows a chart illustrating levels of heat and pressure applied during creation of a conventional hem seal.

As mentioned above, in at least one implementation, the contact areas between portions of thermoplastic film layers of a multi-film thermoplastic structure are formed passing through contact rollers in a process that includes applying heat and pressure (in one or more implementations, simultaneous heat and pressure) to the portions of thermoplastic film layers. For example, FIGS. 4F-4G include a graphical illustrations of heat and pressure applied to a layup 420 of thermoplastic materials to create a seal (i.e., a bond) at each interface between the layers of thermoplastic material. For instance, FIG. 4F illustrates an exemplary process of applying high temperature to the layup 420 followed by application of a relatively low pressure with a nip wheel. As shown in FIG. 4F, the conventional process of forming hem seals (i.e., hot air followed by a nip wheel) requires a relatively high temperature T1 at the application surface to ensure that sufficient heat is applied at the furthest interface from the application surface (Interface Three).

Figure 4G:
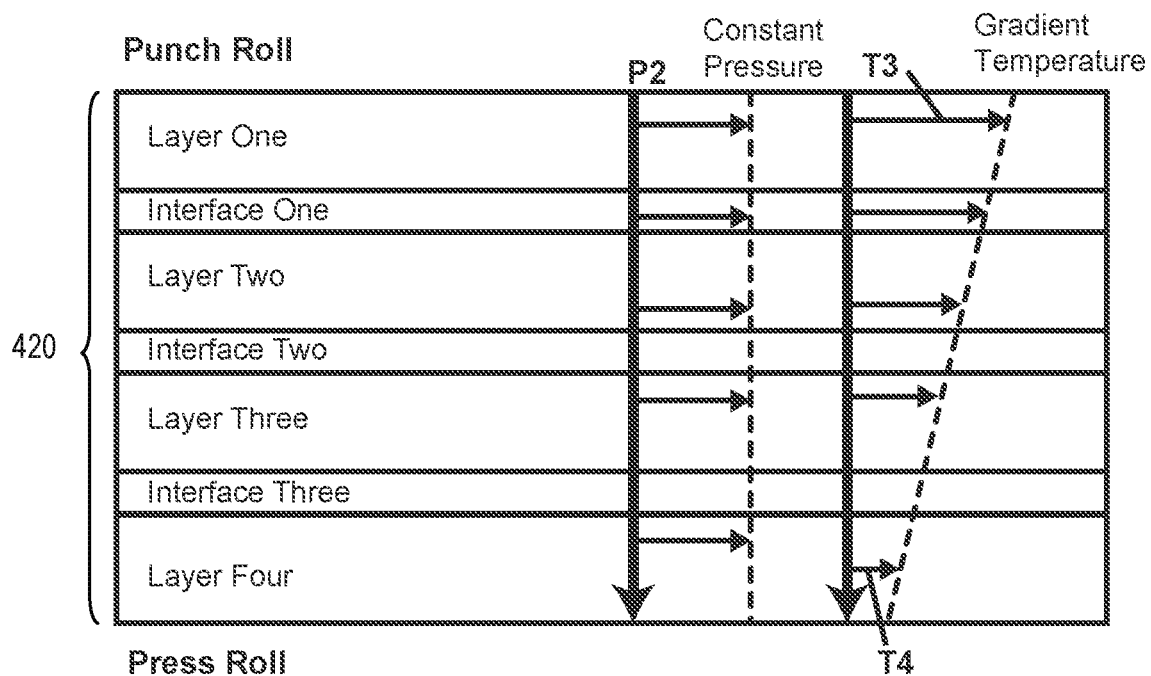
FIG. 4G shows a chart illustrating levels of heat and pressure applied during creation of a hem seal comprised of a continuous contact area according to one or more implementations of the present disclosure.

In contrast, FIG. 4G illustrates an example implementation of the present disclosure, wherein a relative high pressure (i.e., higher relative to that shown in FIG. 4F) and a relatively lower temperature (i.e., lower relative to that shown in FIG. 4F) are simultaneously applied to the layup 420. Indeed, as shown by the foregoing graphical illustrations, forming hem seals according to the implementations described herein can require a relatively lower temperature T3 at the application surface (e.g., relative to temperature T1 of FIG. 4F) in order to apply sufficient heat at the furthest interface from the application surface (Interface Three).

As also illustrated, the resultant gradient temperature between temperature T1 at the application surface and temperature T2 at an opposite surface of the layup 420 is relatively steep in comparison to a gradient temperature imposed by implementations of the present disclosure (e.g., as illustrated in FIG. 4G). In other words, as shown in FIG. 4G, the resultant gradient temperature between temperature T3 at the application surface and temperature T4 at the opposite surface of layup 420 is relatively closer to constant (e.g., compared to the gradient temperature shown in FIG. 4F), thus resulting in a more consistent seal across the layers and interfaces of the layup 420. By applying a gradient of pressure in the transverse direction, where the center is the highest pressure, the hem seal maintains more strength than in a traditional hem seal, which uses a nip wheel at lower pressure with a flatter contact surface.

Figure 4H:
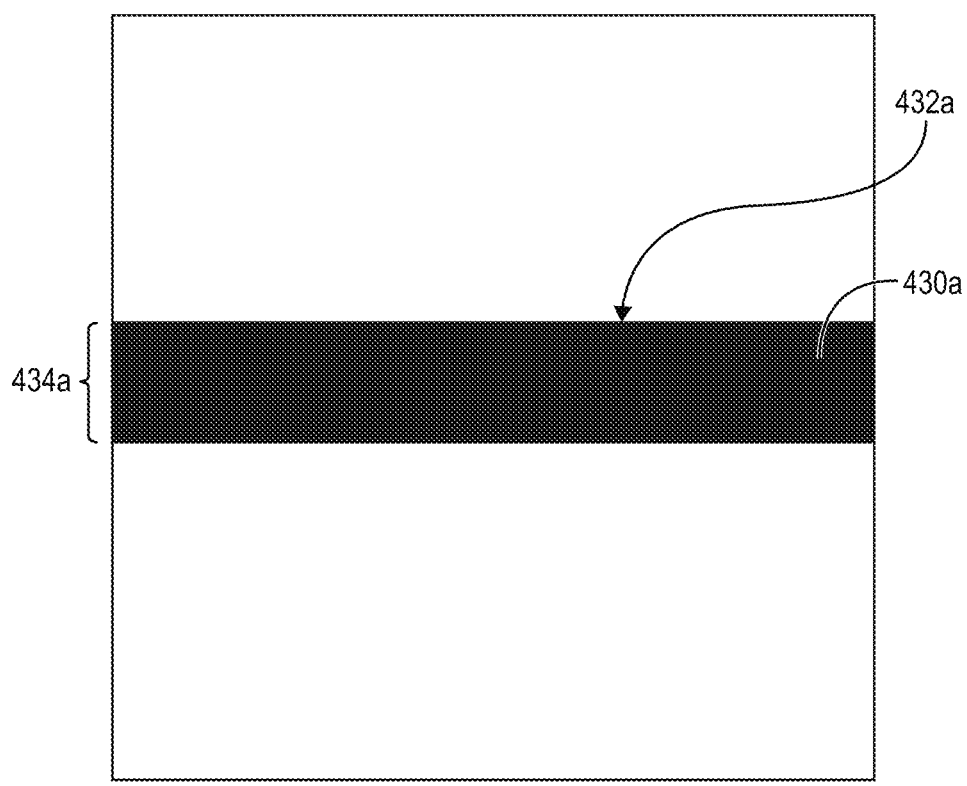
FIG. 4H shows a close-up view of a first side of a hem seal comprised of a continuous contact area according to one or more implementations of the present disclosure.
Figure 4I:
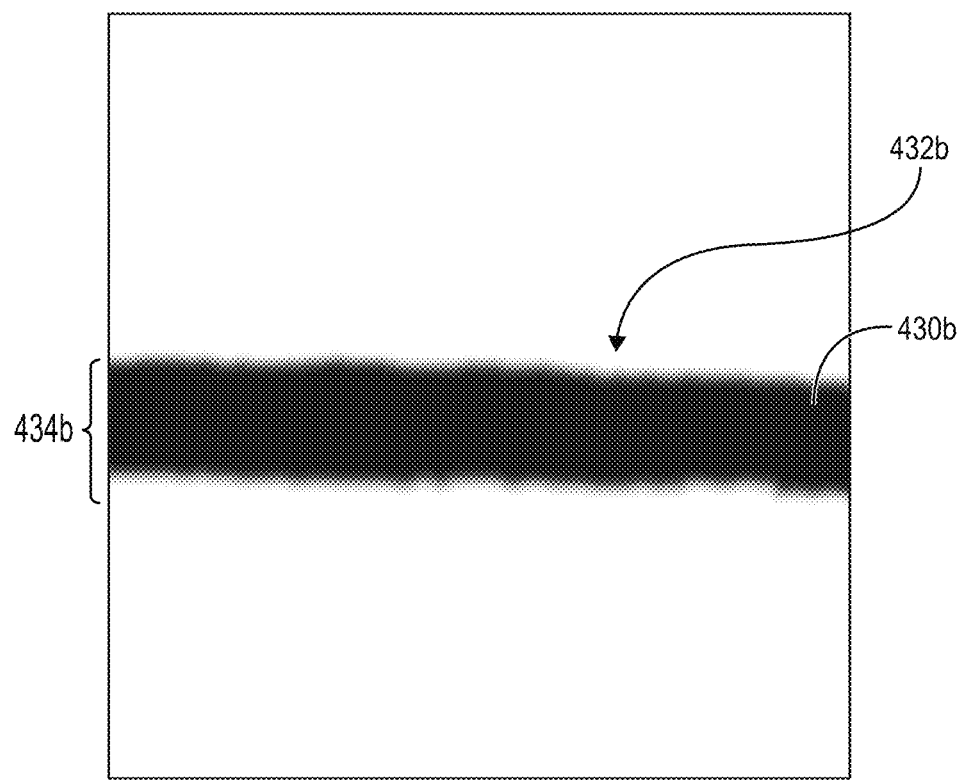
FIG. 4I shows a close-up view of a second side of the hem seal of FIG. 4H.

As mentioned, hem seals comprised of continuous contact areas, according to one or more implementations described herein, exhibit visual (i.e., aesthetic) differences on respective outside and inside faces thereof (i.e., exterior and interior surfaces of the layup in which the hem seal is implemented). To illustrate, FIGS. 4H and 4I show an outside face 430a and an inside face 430b, respectively, of a hem seal comprised of a continuous contact area according to one or more implementations. As shown in FIG. 4H, the outside face 430a of the hem seal comprises a substantially uniform width 434a as the hem seal extends across the sealed thermoplastic material, thus exhibiting a crisp, distinctly uniform edges, such as edge 432a. In contrast, as shown in FIG. 4I, the inside face 430b of the hem seal comprises a variable width 434b as the hem seal extends across the sealed thermoplastic material, resulting in edges, such as edge 432b, that are at least partially indistinct or distorted (i.e., not uniform or distinct). In one or more implementations, a tear resistance of at the first hem seal is greater on the second/inside face 430b of the sidewall relative to the first/outside face 430a of the sidewall.

Figure 5:
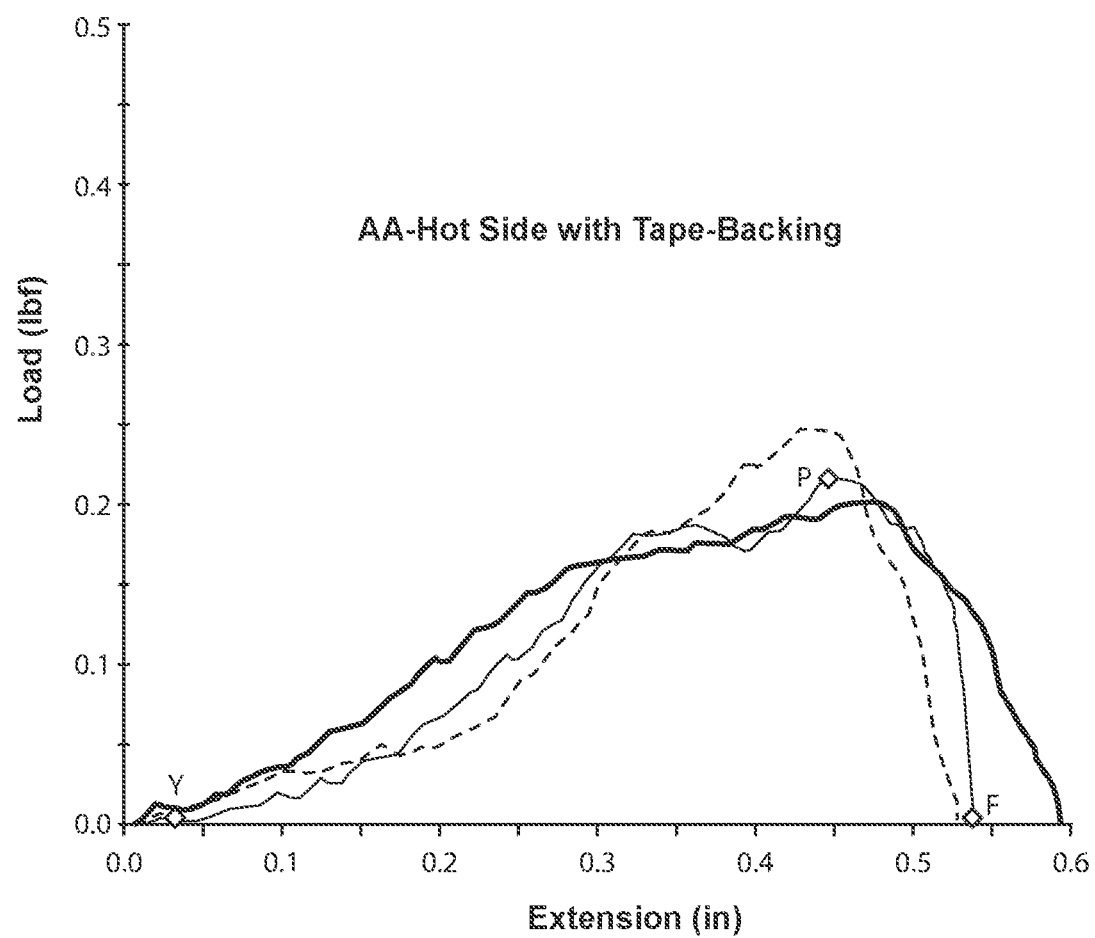
FIG. 5 shows a graph of experimental results showing the gradient strength of a hem seal comprised of a continuous contact area according to one or more implementations of the present disclosure.

FIG. 5 shows results of testing of the tensile strength of a hem seal comprising one or more contacts areas, such as those described above. In particular, when the hem seal is pulled with the outside of the bag film in one grip/clamp and the inside of the bag skirt film in the other grip/clamp, the force/load is captured as the tensile test is performed in the Transverse Direction (TD) at a constant speed. In FIG. 5, the data reported out is the load or peel strength [pounds force] vs. extension [inches] as the hem seal is peeled open. FIG. 5 shows the load increasing as the extension increases to the center of the hem seal. At the center of the hem seal, the load or peel strength peaks ("P" marked on graph), and after the center of the seal, the load or peel strength decreases. This shows a gradient of peel strength across the hem seal that increases to the center and decreases on the other side. Indeed, as shown, in one or more embodiments, the lamination strength of the hem seal is between 2 and 5 times stronger/greater at the center (central longitudinal axis) that at the boarders/edges of the hem seal. Thus, a hem seal comprising a continuous contacts area comprises a lamination gradient such that a lamination strength of the hem seal decreases in a direction extending away from a central longitudinal axis of the hem seal.

Figure 6:
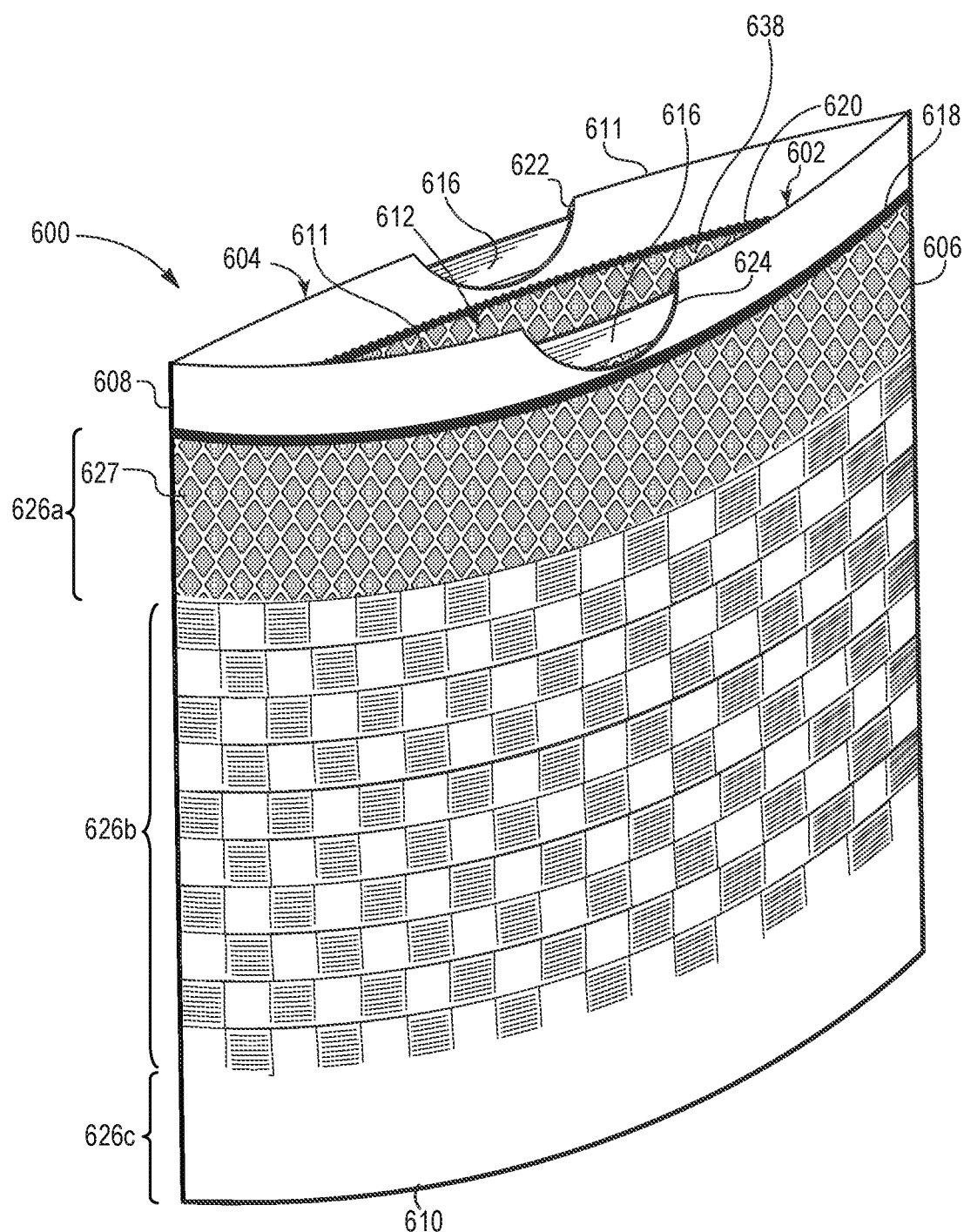
FIG. 6 shows a perspective view of a multi-film thermoplastic bag including a hem seal comprised of a continuous contact area according to one or more implementations of the present disclosure.

FIG. 6 is a perspective view of a multi-film thermoplastic bag 600 including hem seals comprised of continuous contact areas according to an implementation of the present disclosure. The multi-film thermoplastic bag 600 includes a first sidewall 602 and a second sidewall 604. Each of the first and second sidewalls 602, 604 includes a first side edge 606, a second opposite side edge 608, a bottom edge 610 extending between the first and second side edges 606, 608. Each of the first and second sidewalls 602, 604 also includes a top edge 611 extending between the first and second side edges 606, 608 opposite the bottom edge 610. In some implementations, the first sidewall 602 and the second sidewall 604 are joined together along the first side edges 606, the second opposite side edges 608, and the bottom edges 610. The first and second sidewalls 602, 604 may be joined along the first and second side edges 606, 608 and bottom edges 610 by any suitable process such as, for example, a heated pressure seal. In alternative implementations, the first and second sidewalls 602, 604 may not be joined along the side edges. Rather, the first and second sidewalls 602, 604 may be a single uniform piece. In other words, the first and second sidewalls 602, 604 may form a sleeve or a balloon structure.

In some implementations, the bottom edge 610 or one or more of the side edges 606, 608 can comprise a fold. In other words, the first and second sidewalls 602, 604 may comprise a single unitary piece of material. The top edges 611 of the first and second sidewalls 602, 604 may define an opening 612 to an interior of the multi-film thermoplastic bag 600. In other words, the opening 612 may be oriented opposite the bottom edge 610 of the multi-film thermoplastic bag 600. Furthermore, when placed in a trash receptacle (e.g., trash can), the top edges 611 of the first and second sidewalls 602, 604 may be folded over the rim of the receptacle.

In some implementations, the multi-film thermoplastic bag 600 may optionally include a closure mechanism located adjacent to the top edges 611 for sealing the top of the multi-film thermoplastic bag 600 to form an at least substantially or fully enclosed container or vessel. As shown in FIG. 6, in some implementations, the closure mechanism comprises a draw tape 616, a first hem seal 618, and a second hem seal 620. In particular, the first top edge 611 of the first sidewall 602 may be folded over into the interior volume and may be attached or secured to an interior surface of the first sidewall 602 by first hem seal 618. Similarly, the second top edge 611 of the second sidewall 604 is folded over into the interior volume and may be attached to an interior surface of the second sidewall 604 by a second hem seal 620.

Further, in some implementations, each of the first and second hem seals 618, 620 comprises a continuous contact area, such that the layers of the thermoplastic bag 600 secured together by the first and second hem seals 618, 620 are in intimate contact with one another to form the first and second hem seals 618, 620. In some implementations, for example, the first top edge 611 of the first sidewall 602 is folded over into the interior volume and attached or secured to the interior surface of the first sidewall 602 by simultaneous application of heat on an outside face of the first sidewall 602 and pressure between the outside face and an inside face (i.e., within the interior volume) and the outside face of the first sidewall 602. Similarly, the second top edge 611 of the second sidewall 604 is folded over into the interior volume and attached or secured to the interior surface of the second sidewall 604 by simultaneous application of heat on an outside face of the first sidewall 604 and pressure between the outside face and an inside face (i.e., within the interior volume) and the outside face of the first sidewall 602.

As shown in FIG. 6, the continuous contact areas of the first and second hem seals 618, 620 exhibit visual (i.e., aesthetic) differences on respective outside and inside faces thereof. For instance, the outside face of the first hem seal 618 comprises a substantially uniform width as the first hem seal 618 extends between the first and second side edges 606, 608 of the first sidewall 602. While not shown in FIG. 6, the second hem seal 620 comprises a similar appearance on the outside face of the second sidewall 604. In other words, on the outside faces of the first and second sidewalls 602, 604, the first and second hem seals 618, 620 exhibit crisp, distinctly uniform edges across the width of the thermoplastic bag 600. The first and/or second hem seals 618, 620 may have a width of in a first range of about ⅟₁₆ inch (1.5875 mm) to about ¾ inch (19.05 mm), a second range of about ⅛ inch (3.175 mm) to about ½ inch (12.7 mm), or a third range of about ¼ inch (6.35 mm) to about ⅜ inch (9.525 mm). In one or more implementations, the first and/or second hem seals 618, 620 have a width of ⅜ inch (9.525 mm). In another implementation, the first and/or second hem seals 618, 620 have a width of ½ inch (12.7 mm). In another implementation, the first and/or second hem seals 618, 620 have a width that is shorter or longer than the examples listed above.

As also shown in FIG. 6, the inside face of the second hem seal 620 comprises a variable width as the second hem seal 620 extends between the first and second side edges 606, 608 of the second sidewall 604. While not shown in FIG. 6, the first hem seal 618 comprises a similar appearance on an inside face of the first sidewall 602 (i.e., within the interior volume of the thermoplastic bag 600). In other words, on the inside faces of the first and second sidewalls 602, 604, the first and second hem seals 618, 620 include edges that are at least partially indistinct or distorted (i.e., not uniform or distinct).

While FIG. 6 shows both of the first and second hem seals 618, 620 comprising continuous contact areas, some implementations include hem seals of different types, such as but not limited to a thermoplastic bag having a first hem seal comprised of a continuous contact area and a second hem seal formed by an alternative process (e.g., application of hot air followed by static pinning of the layers together to form a second hem seal).

As illustrated, the draw tape 616 extends through hem channels created by the first and second hem seals 618, 620 along the first and second top edges 611. The hem channel created by the first hem seal 618 includes a first aperture 624 (e.g., notch) extending through the hem channel and exposing a portion of the draw tape 616. Similarly, the hem channel created by the second hem seal 620 includes a second aperture 622 extending through the hem channel and exposing another portion of the draw tape 616. During use, pulling the draw tape 616 through the first and second apertures 622, 624 will cause the top edges 611 to constrict. As a result, pulling the draw tape 616 through the first and second apertures 622, 624 will cause the opening 612 of the multi-film thermoplastic bag 600 to at least partially close or reduce in size. The draw tape closure mechanism may be used with any of the implementations of a multi-film thermoplastic bag described herein.

Although the multi-film thermoplastic bag 600 is described herein as including a draw tape closure mechanism, one of ordinary skill in the art will readily recognize that other closure mechanisms may be implemented into the multi-film thermoplastic bag 600. For example, in some implementations, the closure mechanism may include one or more of flaps, adhesive tapes, a tuck and fold closure, an interlocking closure, a slider closure, a zipper closure, or any other closure structures known to those skilled in the art for closing a bag.

Each of the sidewalls 602, 604 of the multi-film thermoplastic bag 600 comprise a multi-film thermoplastic structure, such as that shown in FIG. 2 above. Thus, each sidewall 602, 604 includes at least an inner layer and an outer layer. Indeed, the thermoplastic bag 600 has a bag-in-bag structure. In other words, the thermoplastic bag 600 includes a first bag and a second bag positioned therein. More particularly, the first thermoplastic bag comprises first and second opposing sidewalls joined together along a first side edge, an opposite second side edge, and a closed first bottom edge. The second thermoplastic bag is positioned within the first thermoplastic bag. The second thermoplastic bag comprises third and fourth opposing sidewalls joined together along a third side edge, an opposite fourth side edge, and a closed second bottom edge. In one or more implementations, the first thermoplastic bag (e.g., the outer layer) is pigmented with a first color, and the second thermoplastic bag is pigmented with a second color (e.g., the inner layer is pigmented with the second color). As described above, the differing colors of the layers can allow for the creation of visually distinct contact areas when the inner bag and the outer bag are placed into intimate contact.

As shown in FIG. 6, the multi-film thermoplastic bag 600 includes a first region or grab zone 626a, a second region 626b, and a third region 626c. In the implementation shown, the first region 626a includes a pattern of contact areas 627 (as also shown formed within in hem skirt 638 in the bag interior). The pattern of contact areas 627 shown in FIG. 6 includes a medium pattern density and exists on the outer and inner surfaces of the first and second sidewalls 602, 604. Additionally, the first region 626*a* covers a portion of the multi-film thermoplastic bag 600 extending from the first hem seal 618 toward the bottom edge 610 of the multi-film thermoplastic bag 600. Additionally, the pattern of contact areas 627 is registered to the same location on the second sidewall 604 of the multi-film thermoplastic bag 600. The third region 626*c* of the multi-film thermoplastic bag 600 is a flat portion of the multi-film thermoplastic bag 600.

In one or more implementations, the second region 626*b* includes a pattern of deformations including at least one of raised rib-like elements in a strainable network or alternating thicker ribs and thinner stretched webs (e.g., SELF'ed or ring rolled patterns). For example, as shown in FIG. 6, the second region 626*b* includes a checkerboard pattern of SELF'ed squares as described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety.

As shown by FIG. 6, the checkerboard pattern of deformations can comprise a repeating pattern of raised rib-like elements. In particular, the checkerboard pattern of deformations can include a first plurality of rib-like elements arranged pattern. Portions of the raised rib-like elements of the outer layer can be in direct contact and have the appearance of the inner of the bag 600. In contrast to the pattern of contact areas 627, however, the portions of deformations (e.g., raised rib-like element of a SELFing pattern or alternating thicker ribs and thinner stretched webs of a ring rolling pattern) stretch the film incrementally to create areas of varying gauge or thickness.

The thermoplastic bag 600, as shown, includes side heat seals along the side edges 606, 608. As shown, the side heat seals can comprise areas in which all four or more layers of the thermoplastic bag are in intimate contact. As such, the side heat seal can have the same appearance as the contact areas. The heat seals use higher temperature and fuse film layers together such that the heat seal cannot be broken without causing the film layers of the heat seal to fail, which is in direct contrast to a peelable seal formed from contact areas.

As shown by FIG. 6, the contact areas in the grab zone 626*a* form a diamond pattern 627 that provides the grab zone 626*a* with a unique visual appearance that connotes strength. Additionally, as mentioned above, the contact areas in the grab zone 626*a* can provide increased stiffness and other tactile cues that connote strength. As such, the contact areas can provide the grab zone with both a look and feel of increased strength.

While FIG. 6 illustrates a pattern of contact areas 627 comprising repeating diamond-shaped elements, other implementations can comprise differently shaped contact areas. For example, the contact areas can comprise squares, circles, ovals, stars, hexagons, or other shapes. As such, the use of diamond-shaped contact areas is for illustrative purpose and does not limit the implementations of the present invention. Furthermore, other implementations can exclude the pattern of contact areas 627 altogether, as well as the pattern of deformations shown in region 626*b*.

Figure 7A:
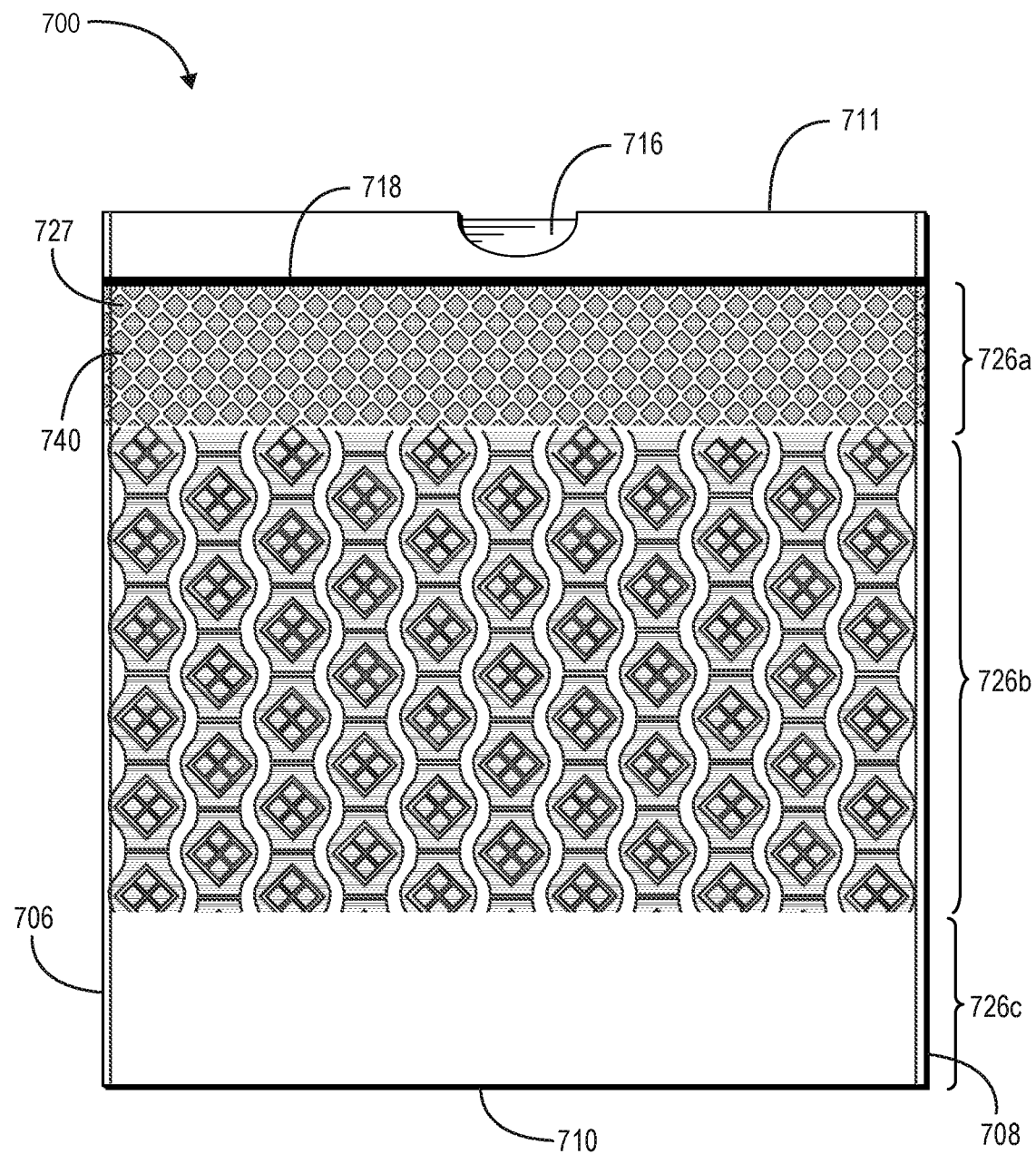
FIG. 7A shows a front view of a multi-film thermoplastic bag including a hem seal comprised of a continuous contact area according to one or more implementations of the present disclosure.

FIG. 7A illustrates a front view of a multi-film thermoplastic bag 700 including a hem seal comprised of a continuous contact area. The multi-film thermoplastic bag 700 can include many of the same features as the thermoplastic bag 600 described above.

As shown in FIG. 7A, the multi-film thermoplastic bag 700 includes a first region or grab zone 726*a*, a second region 726*b*, and a third region 726*c*. In the implementation shown, the first region 726*a* includes a pattern of contact areas 727. The pattern of contact areas 727 shown in FIG. 7A includes a medium pattern density and exists on the outer and inner surfaces of the first and second sidewalls where the individual contact areas are shaped as diamonds. Additionally, the first region 726*a* covers a portion of the multi-film thermoplastic bag 700 extending from the bottom of the hem channel toward the bottom edge 710 of the multi-layer thermoplastic bag 700. Additionally, the pattern of contact areas 727 is registered to the same location on the second sidewall of the multi-layer thermoplastic bag 700. The third region 726*c* of the multi-film thermoplastic bag 700 is a flat portion of the multi-layer thermoplastic bag 700.

Further, as illustrated, the multi-layer thermoplastic bag 700 includes a hem seal 718 comprised of a continuous contact area extending between first and second side edges 706, 708. In particular, the hem seal 718 secures a folded top edge 711 to an interior surface of the multi-layer thermoplastic bag 700 to form a hem channel that retains a draw tape 716 therein. As shown, the continuous contact area of the hem seal 718 extends across an outside surface of the multi-layer thermoplastic bag 700 with a substantially uniform width, such that the hem seal 718 has visually distinct edges that appear smooth and uninterrupted as the hem seal 718 extends between the first and second side edges 706, 708. The appearance of the hem seal 718 on the outside (i.e., exterior) surface of the bag 700, for example, can result from heat being directly applied to the outside surface of the bag 700 according to the processes described herein.

Figure 7B:
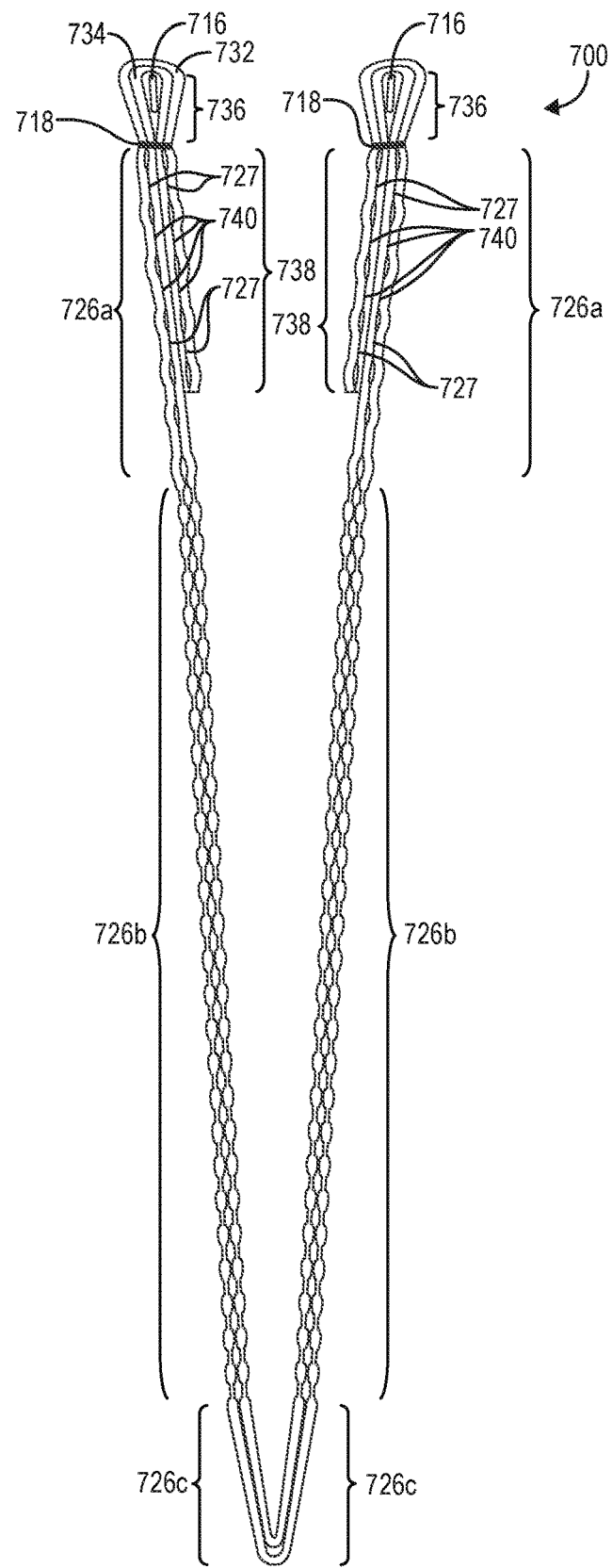
FIG. 7B illustrates a cross-sectional view of the multi-film thermoplastic bag of FIG. 7A.

FIG. 7B illustrates a cross-sectional view of one or more implementations of the multi-film thermoplastic bag 700 shown in FIG. 7A. For example, as shown in FIG. 7B, the multi-film thermoplastic bag 700 includes an outer first thermoplastic bag 732 and an inner second thermoplastic bag 734 positioned within the first thermoplastic bag 732. The top edges of the first thermoplastic bag 732 and the second thermoplastic bag 734 are folded over the draw tape 716 to form a hem channel 736. In one or more implementations, the draw tape 716 is movable in the hem channel 736 so as to cinch the multi-film thermoplastic bag 700 closed when pulled through the draw tape apertures. In the embodiment illustrated in FIG. 7B, the hem channel 736 is secured or held in place by a hem seal 718 made up of continuous contact areas at a lower end of the hem channel 736. In particular, the hem seals 718 comprise a continuous seal formed in a single operation (e.g., layers of the thermoplastic bag 700) through the contact rollers 302*a* or 402 described above in relation to FIGS. 3D or 4A, respectively. In contrast to the side seals, the hem seals 718 are formed by contact rollers rather than a seal bar or other process. The hem seals 718 secure the hem channel 736. In particular, the hem seals 718 secure the hem skirt 738 to the inner second thermoplastic bag 734. Optionally, the hem seals 718 secure the outer first thermoplastic bag 732, the inner second thermoplastic bag 734, and the layers of the hem skirt 738 together. Referring to FIG. 7A, the hem seals 718 comprise continuous contact areas at an upper end of the first region 726*a*. The hem seals 718 are each a single seal in that it is formed in a single operation (i.e., simultaneous application of heat and pressure via punch rollers, nip rollers, or pinch rollers as described in relation to FIGS. 3A-3D, 4A-4B, and 9-11).

As discussed above, the sidewalls of the multi-film thermoplastic bag 700 can include the first region 726*a*, the second region 726*b*, and the third region 726*c*, where each region includes different bonding, or no bonding, between the first thermoplastic bag 732 and the second thermoplastic bag 734. For example, as shown in FIG. 7B, the first region 726a includes contact areas 727, 740 between the first thermoplastic bag 732 and the second thermoplastic bag 734 where the first thermoplastic bag 732 and the second thermoplastic bag 734 have been brought into intimate contact via any of the processes described above, while leaving the thickness of the bags 732, 734 substantially unchanged in the first region 726a. The second region 726b includes areas of a plurality of deformations, where the plurality of deformations includes alternating thicker ribs and thinner stretched webs between the first and second bags 732, 734. The third region 726c includes an area that is flat and undeformed between the first and second bags 732, 734.

As further shown in FIG. 7B, folding over the top edges of the first and second bags 732, 734 creates a hem skirt 738 extending from the hem seals 718 down an inner surface of the second thermoplastic bag 734. As shown, the hem skirt 738 includes portions of the first and second bags 732, 734 that are the same length, where the length (distance from the hem channel toward the bottom of the bag) of the hem skirt 738. The hem skirt 738 may have a length of in a first range of about 0.1 inch (0.254 cm) to about 10 inches (25.4 cm), a second range of about 0.5 inches (1.27 cm) to about 8 inches (20.3 cm), a third range of about 1 inch (2.54 cm) to about 6 inches (15.2 cm), a fourth range of about 3 inches (7.6 cm) to about 6 inches (15.2 cm). In one or more implementations, the hem skirt 738 has a length of 0.5 inches (1.27 cm). In another implementation, the hem skirt 738 has a length of 4 inches (10.2 cm). In one implementation, the hem skirt 738 has a length of 5 inches (12.7 cm). In another implementation, the hem skirt 738 has a length that is shorter or longer than the examples listed above.

The grab zone or first region 726a may have a length (distance the grab zone extends from the hem channel toward the bottom of the bag) of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 3 inches (7.6 cm) to about 6 inches (15.2 cm). In one implementation, the grab zone has a length of 5 inches (12.7 cm). In a further implementation, the grab zone has a length of 4 inches (10.2 cm). In another implementation, the grab zone has a length that is shorter or longer than the examples listed above.

Furthermore, the hem skirt 738 can have a length that is co-extensive or the same length as the grab zone 726a. Alternatively, the hem skirt 738 has a length less than a length of the grab zone 726a. For example, FIG. 7B illustrates that the hem skirt 738 has a length approximately 66% of the length of the grab zone 726a. In alternative implementations, the hem skirt 738 has a length approximately 10%, 20% 25% 33%, 50%, 75%, 80% or 90% of the length of the grab zone 726a. In another implementation, the hem skirt 738 has a length that is relatively shorter or longer than the examples listed above compared to the grab zone 726a. For example, in one or more implementations, the hem skirt 738 is longer than the grab zone 726a.

As further shown in FIG. 7B, the contact areas 727, 740 in the first region 726a extends through the hem skirt 738. For example, in at least one implementation, the contact areas 727, 740 in the first region 726a are formed after the top edges of the first and second bags 732, 734 are folded over and secured via the hem seals 718. Thus, the process that forms the contact areas 727, 740 (e.g., via the contact rollers 302, 302a, 304 and/or the press roll 310 shown in FIGS. 3A-3D above) also forms contact areas 727, 740 between the first and second bags 732, 734 in the hem skirt 738, and contact areas 727, 740 between the sidewalls of the bag 700 and the hem skirt 738. The contact areas 727, 740 in the hem skirt 738 in combination with the contact areas 727 in the outer portion of the multi-film thermoplastic bag 700 can create rigidity in the multi-film thermoplastic bag 700 in the grab zone that is 0-3 times greater than the rigidity of the multi-film thermoplastic bag 700 in the other regions.

Similarly, in one or more implementations, the hem seals 718 can be formed by continuous contact areas, such that the sidewalls of the bag 700, included the folded over portion mentioned above, are in intimate contact and exhibit similar material characteristics to the contact areas 727, 740. In some implementations, the continuous contact areas of the hem seals 718 and the other contact areas 727, 740 are formed simultaneously (e.g., via the contact rollers 302, 302a, 304 and/or the press roll 310 shown in FIGS. 3A-3D above). Alternatively, as described above in relations to FIGS. 4A-4C, the continuous contact areas of the hem seals 718 can be formed by a separate process, before or after formation of the contact areas 727, 740.

The portions of the first and second bags 732, 734 forming the hem skirts can be the same length or different lengths. For example, the top edge of the outer first thermoplastic bag 732 can extend a greater length in the hem skirt 738 than the top edge of the inner second thermoplastic bag 734. In some implementations, the longer edge of the first thermoplastic bag 732 may be unattached from the inner surface of the second thermoplastic bag 734 by contact areas. In other implementations, the longer edge of the first thermoplastic bag 732 may be in contact with the inner surface of the second thermoplastic bag 734 via one or more contact areas, or another type of lamination.

The number of films (e.g., layers) that the contact areas 727, 740 bond together can vary in different implementations. For example, the contact areas 727, 740 can secure two layers (e.g., the two films of the sidewall), the contact areas 727, 740 can secure three layers (e.g., the two films of the sidewall and one of the films extending along the inside of the sidewall), or the contact areas 727, 740 can secure four layers (e.g., the two films of the sidewall and both of the films extending along the inside of the sidewall). The more layers bonded by the contact areas 727, 740, the greater the stiffness and reinforcement. Moreover, in some implementations, the continuous contact areas of hem seals 718 can secure a hem channel of a single-layer thermoplastic bag by forming the continuous contact area between a single-layer sidewall of the bag and a fold over portion of the same single-layer sidewall.

In yet another implementation, the top edge of the inner second thermoplastic bag 734 may extend beyond the top edge of the outer first thermoplastic bag 732. For example, the top edge of the inner second thermoplastic bag 734 may extend any distance beyond the top edge of the outer first thermoplastic bag 732. In another implementation, the hem skirt 738 may only include either the top edge of the outer first thermoplastic bag 732 or the top edge of the inner second thermoplastic bag 734. In that implementation the hem skirt 738 may include contact areas 727, 740 between either the top edge of the outer first thermoplastic bag 732 or the top edge of the inner second thermoplastic bag 734 and the inner surface of the inner second thermoplastic bag 734. Accordingly, the contact areas 727, 740 can be between two, three, or four layers of the multi-film thermoplastic bag 700.

Figure 7C:
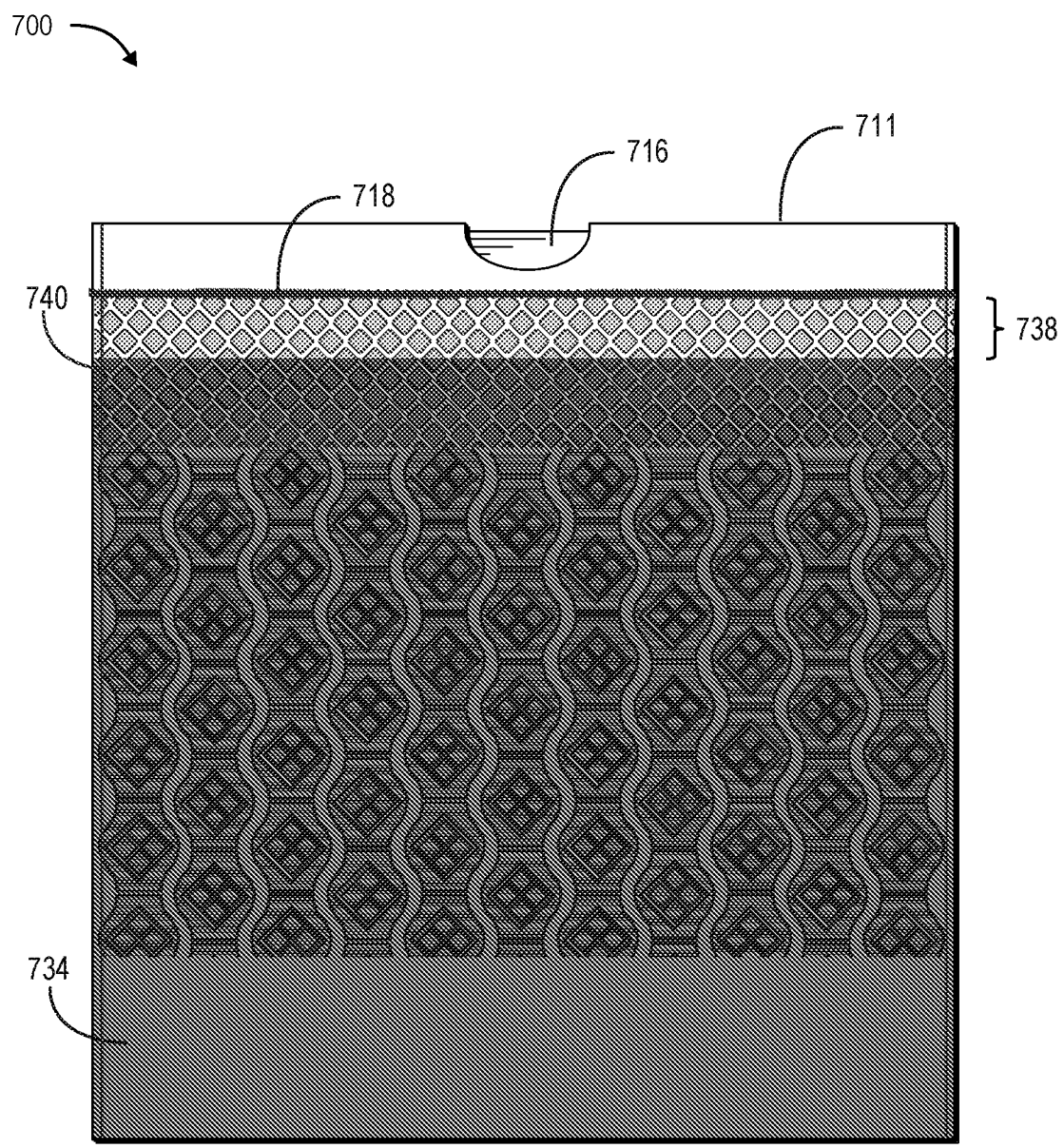
FIG. 7C shows a front view of an inside of the multi-film thermoplastic bag of FIG. 7A.

FIG. 7C illustrates an inside of the multi-film thermoplastic bag 700. In other words, FIG. 7C illustrates a view looking from the inside of the multi-film thermoplastic bag 700 toward the inner surface of the inner second thermoplastic bag 734. In the implementation of multi-film thermoplastic bag 700 shown in FIGS. 7A-7C, the outer first thermoplastic bag 732 (or outer film of the sidewall) has a first color (e.g., a lighter color). The inner second thermoplastic bag 734 (or inner film of the sidewall) has a second color (e.g., a darker color). As described above in relation to FIG. 6, this allows the multi-film thermoplastic bag 700 to have contact areas that differ in appearance from separated portions (areas in which the inner second thermoplastic bag 734 is not in intimate contact with the outer first thermoplastic bag 732) surrounding the contact areas as shown in FIG. 7A.

Moreover, as shown in FIG. 7C, the continuous contact area of the hem seal 718 secures a folded top edge 711 to an interior surface of the multi-layer thermoplastic bag 700 to form the hem channel that retains a draw tape 716 therein. As shown, the continuous contact area of the hem seal 718 extends across an interior surface of the multi-layer thermoplastic bag 700 with a variable width, such that the hem seal 718 has indistinct or distorted edges that appear distorted relative to the substantially uniform edges of the hem seal 718 on the outside surface of the bag 700 (i.e., as shown in FIG. 7A). The appearance of the hem seal 718 on the interior surface of the bag 700, for example, is due to partial contact of the inner layers of the bag 700 relative to the outer layers that are in closer proximity to the outside face of the hem seal 718.

Figure 8:
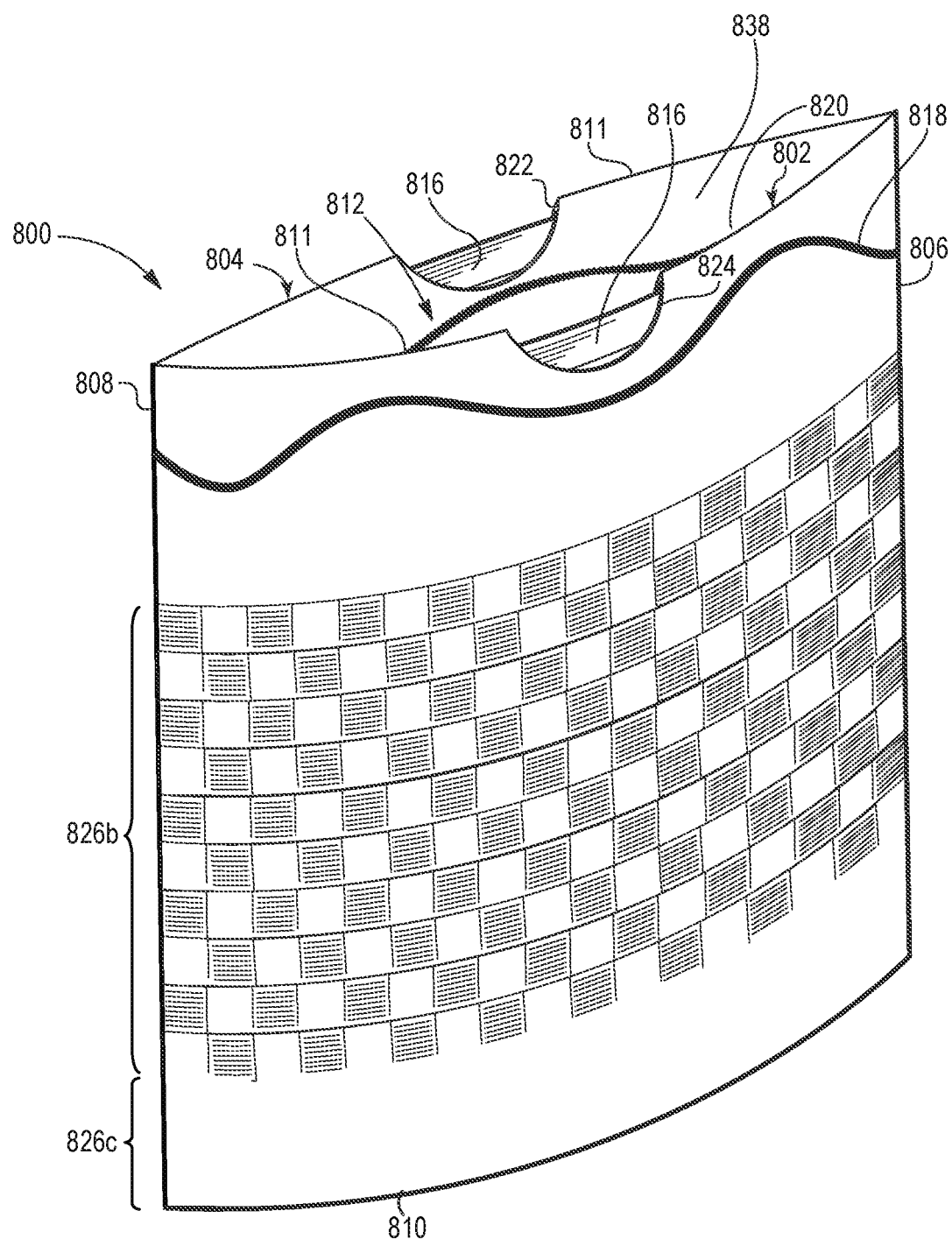
FIG. 8 shows a perspective view of a multi-film thermoplastic bag including a non-linear hem seal comprised of a continuous contact area according to one or more implementations of the present disclosure.

FIG. 8 is a perspective view of a multi-film thermoplastic bag 800 including ahem seals comprised of a non-linear continuous contact areas according to an implementation of the present disclosure. The multi-film thermoplastic bag 800 includes a first sidewall 802 and a second sidewall 804. Each of the first and second sidewalls 802, 804 includes a first side edge 806, a second opposite side edge 808, a bottom edge 810 extending between the first and second side edges 806, 808. Each of the first and second sidewalls 802, 804 also includes a top edge 811 extending between the first and second side edges 806, 808 opposite the bottom edge 810. In some implementations, the first sidewall 802 and the second sidewall 804 are joined together along the first side edges 806, the second opposite side edges 808, and the bottom edges 810. The first and second sidewalls 802, 804 may be joined along the first and second side edges 806, 808 and bottom edges 810 by any suitable process such as, for example, a heated pressure seal. In alternative implementations, the first and second sidewalls 802, 804 may not be joined along the side edges. Rather, the first and second sidewalls 802, 804 may be a single uniform piece. In other words, the first and second sidewalls 802, 804 may form a sleeve or a balloon structure.

In some implementations, the bottom edge 810 or one or more of the side edges 806, 808 can comprise a fold. In other words, the first and second sidewalls 802, 804 may comprise a single unitary piece of material. The top edges 811 of the first and second sidewalls 802, 804 may define an opening 812 to an interior of the multi-film thermoplastic bag 800. In other words, the opening 812 may be oriented opposite the bottom edge 810 of the multi-film thermoplastic bag 800. Furthermore, when placed in a trash receptacle (e.g., trash can), the top edges 811 of the first and second sidewalls 802, 804 may be folded over the rim of the receptacle.

In some implementations, the multi-film thermoplastic bag 800 may optionally include a closure mechanism located adjacent to the top edges 811 for sealing the top of the multi-film thermoplastic bag 800 to form an at least substantially fully enclosed container or vessel. As shown in FIG. 8, in some implementations, the closure mechanism comprises a draw tape 816, a first hem seal 818, and a second hem seal 820 (shown on hem skirt 838 within the bag interior). In particular, the first top edge 811 of the first sidewall 802 may be folded over into the interior volume and may be attached or secured to an interior surface of the first sidewall 802 by first hem seal 818. Similarly, the second top edge 811 of the second sidewall 804 is folded over into the interior volume and may be attached to an interior surface of the second sidewall 804 by a second hem seal 820.

Further, as shown in FIG. 8, each of the first and second hem seals 818, 820 comprises a non-linear continuous contact area, such that the first and second hem seals 818, 820 comprise an undulating pattern (i.e., a wave pattern) extending between the first and second side edges 806, 808 of the respective first and second sidewalls 802, 804. In other implementations, alternative patterns or configurations of non-linear continuous contact areas can be implemented as hem seals. As shown in FIG. 8, for example, the first hem seal 818 has a different shape than (e.g., is shifted relative to) the second hem seal 820 relative to the top edges 811 of the thermoplastic bag 800. Alternatively, in some embodiments, respective first and second hem seals of a thermoplastic bag can be of the same shape, phase, type, size, and/or position. In one or more implementations, non-linear hem seals comprised of non-linear continuous contact areas can result in lower film yielding per inch on account of moving the bottom of each hem seal further from the grab points commonly used by consumers to grasp and lift the thermoplastic bag. Also, in some implementations, hem seals comprised of non-linear continuous contact areas result in hem seals having a greater total length than the width of the thermoplastic bag.

Moreover, in some implementations, the layers of the thermoplastic bag 800 secured together by the non-linear continuous contact areas of the first and second hem seals 818, 820 are in intimate contact with one another to form the first and second hem seals 818, 820. In some implementations, for example, the first top edge 811 of the first sidewall 802 is folded over into the interior volume and attached or secured to the interior surface of the first sidewall 802 by simultaneous application of heat on an outside face of the first sidewall 802 and pressure between the outside face and an inside face (i.e., within the interior volume) and the outside face of the first sidewall 802. Similarly, the second top edge 811 of the second sidewall 804 is folded over into the interior volume and attached or secured to the interior surface of the second sidewall 804 by simultaneous application of heat on an outside face of the first sidewall 804 and pressure between the outside face and an inside face (i.e., within the interior volume) and the outside face of the first sidewall 802.

As shown in FIG. 8, the non-linear continuous contact areas of the first and second hem seals 818, 820 exhibit visual (i.e., aesthetic) differences on respective outside and inside faces thereof. For instance, the outside face of the first hem seal 818 comprises a substantially uniform width as the first hem seal 818 extends between the first and second side edges 806, 808 of the first sidewall 802. While not shown in FIG. 8, the second hem seal 820 comprises a similar appearance on the outside face of the second sidewall 804. In other words, on the outside faces of the first and second sidewalls 802, 804, the first and second hem seals 818, 820 exhibit crisp, distinctly uniform edges across the width of the thermoplastic bag 800.

As also shown in FIG. 8, the inside face of the second hem seal 820 comprises a variable width as the second hem seal 820 extends between the first and second side edges 806, 808 of the second sidewall 804. While not shown in FIG. 8, the first hem seal 818 comprises a similar appearance on an inside face of the first sidewall 802 (i.e., within the interior volume of the thermoplastic bag 800). In other words, on the inside faces of the first and second sidewalls 802, 804, the first and second hem seals 818, 820 include edges that are at least partially indistinct or distorted (i.e., not uniform or crisp).

While FIG. 8 shows both of the first and second hem seals 818, 820 comprising non-linear continuous contact areas, some implementations include hem seals of different types, such as but not limited to a thermoplastic bag having a first hem seal comprised of a non-linear continuous contact area and a second hem seal formed by an alternative process (e.g., application of hot air followed by static pinning of the layers together to form a second hem seal).

As illustrated, the draw tape 816 extends through hem channels created by the first and second hem seals 818, 820 along the first and second top edges 811. The hem channel created by the first hem seal 818 includes a first aperture 824 (e.g., notch) extending through the hem channel and exposing a portion of the draw tape 816. Similarly, the hem channel created by the second hem seal 820 includes a second aperture 822 extending through the hem channel and exposing another portion of the draw tape 816. During use, pulling the draw tape 816 through the first and second apertures 822, 824 will cause the top edges 811 to constrict. As a result, pulling the draw tape 816 through the first and second apertures 822, 824 will cause the opening 812 of the multi-film thermoplastic bag 800 to at least partially close or reduce in size. The draw tape closure mechanism may be used with any of the implementations of a multi-film thermoplastic bag described herein.

Although the multi-film thermoplastic bag 800 is described herein as including a draw tape closure mechanism, one of ordinary skill in the art will readily recognize that other closure mechanisms may be implemented into the multi-film thermoplastic bag 800. For example, in some implementations, the closure mechanism may include one or more of flaps, adhesive tapes, a tuck and fold closure, an interlocking closure, a slider closure, a zipper closure, or any other closure structures known to those skilled in the art for closing a bag.

Each of the sidewalls 802, 804 of the multi-film thermoplastic bag 800 comprise a multi-film thermoplastic structure, such as that shown in FIG. 2 above. Thus, each sidewall 802, 804 includes at least an inner layer and an outer layer. Indeed, the thermoplastic bag 800 has a bag-in-bag structure. In other words, the thermoplastic bag 800 includes a first bag and a second bag positioned therein. More particularly, the first thermoplastic bag comprises first and second opposing sidewalls joined together along a first side edge, an opposite second side edge, and a closed first bottom edge. The second thermoplastic bag is positioned within the first thermoplastic bag. The second thermoplastic bag comprises third and fourth opposing sidewalls joined together along a third side edge, an opposite fourth side edge, and a closed second bottom edge. In one or more implementations, the first thermoplastic bag (e.g., the outer layer) is pigmented with a first color, and the second thermoplastic bag is pigmented with a second color (e.g., the inner layer is pigmented with the second color). As described above, the differing colors of the layers can allow for the creation of contact areas when the inner bag and the outer bag are placed into intimate contact.

As shown in FIG. 8, the multi-film thermoplastic bag 800 includes a first region or grab zone extending from a hem channel sealed by the non-linear hem seal 818 to a second region 826b, and a third region 826c extending from the second region 826b toward the bottom edge 810. As shown, the non-linear hem seal 818 extends at least partially into the grab zone due to the undulations of the depicted wave pattern. In the implementation shown, the second region 826b includes a pattern of deformations including at least one of raised rib-like elements in a strainable network or alternating thicker ribs and thinner stretched webs (e.g., SELF'ed or ring rolled patterns). For example, as shown in FIG. 8, the second region 826b includes a checkerboard pattern of SELF'ed squares as described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety.

As shown by FIG. 8, the checkerboard pattern of deformations can comprise a repeating pattern of raised rib-like elements. In particular, the checkerboard pattern of deformations can include a first plurality of rib-like elements arranged pattern. Portions of the raised rib-like elements of the outer layer can be in direct contact and have the appearance of the inner of the bag 800. The portions of deformations (e.g., raised rib-like element of a SELFing pattern or alternating thicker ribs and thinner stretched webs of a ring rolling pattern) stretch the film incrementally to create areas of varying gauge or thickness.

While FIG. 8 does not illustrate a pattern of contact areas within the grab zone of the thermoplastic bag 800, other implementations can comprise contact areas of various shapes in different areas of the bag, such as but not limited to the contact areas shown in FIG. 8.

Figure 9:
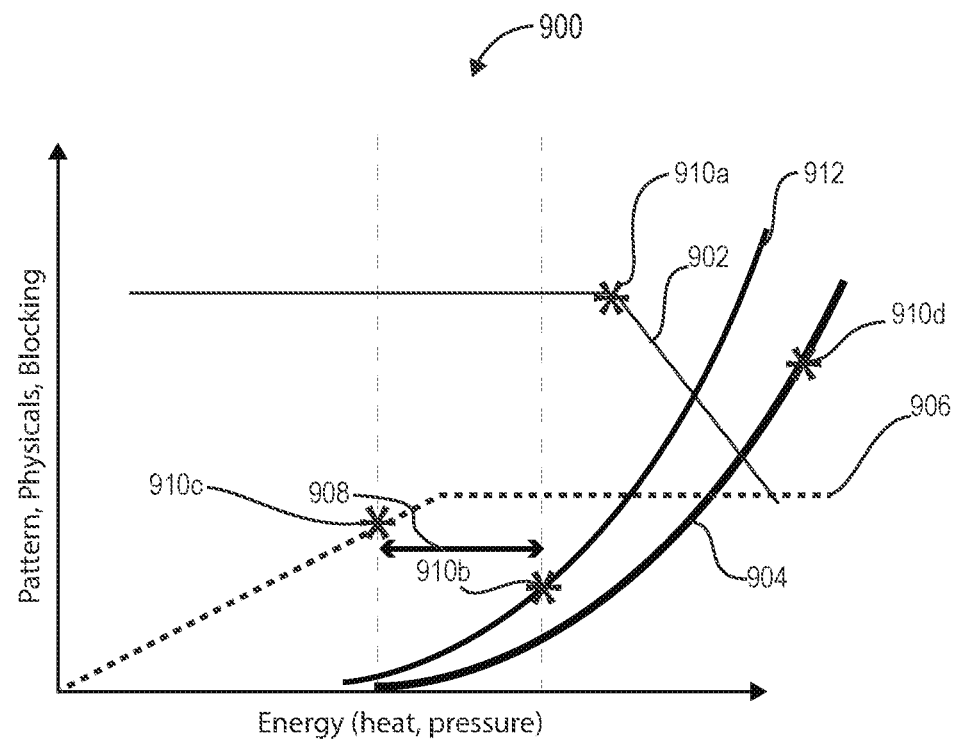
FIG. 9 shows a chart illustrating levels of heat and pressure applied during the contact area creation process according to one or more implementations of the present disclosure.

As mentioned above, in at least one implementation, the contact areas between portions of thermoplastic film layers of a multi-film thermoplastic structure are formed passing through contact rollers in a process that includes applying heat and pressure (in one or more implementations, simultaneous heat and pressure) to the portions of thermoplastic film layers. FIG. 9 includes a chart 900 illustrating an optimal amount of heat and pressure applied during the heat embossing process that results in preferred quality measures (e.g., visual or pattern, physicals, blocking, and holes) of the resulting multi-film thermoplastic structure.

For example, as shown in FIG. 9, as heat and pressure increase, the physical properties of a multi-film thermoplastic structure indicated by the curve 902 remain the same until a drop off point 910a (e.g., yield point). After the drop off point 910a, the continued increase of heat and pressure cause the physical properties of the multi-film thermoplastic structure to deteriorate rapidly. As used herein, the "physical properties," "physical parameters," or "physicals" of a multi-film thermoplastic structure refer to the molecular strength of the multi-film thermoplastic structure. In particular, the physicals indicated by curve 902 can comprise transverse direction tensile strength, transverse or machine direction tear resistance, or puncture resistance (e.g., as measured by a dart drop test).

As further shown in FIG. 9, as heat and pressure increase in the process, the blocking of the multi-film thermoplastic structure indicated by the curve 904 increases in approximately an exponential manner. As used herein, "blocking" refers to the level with which a thermoplastic film sticks to itself. As indicated by the point 910*b* on the curve 912, there is an amount of heat and pressure beyond which the amount of blocking exhibited by a multi-film thermoplastic structure is undesirable. For example, a high level of blocking can cause the multi-film thermoplastic structure to self-stick in such a way that it is unusable for the processes described herein. In particular, by at least point 910*b* the films are sealed together in a manner that they cannot be separated without causing the individual layers to fail.

Moreover, as shown in FIG. 9, as heat and pressure increase in the heat embossing process, the aesthetic value (e.g., the visibility as measured by ΔE) of the pattern of heated pressure seals formed by the heat embossing process increases, as indicated by the curve 906. For example, as indicated by the point 910*c*, an increasing amount of heat and pressure during the heat embossing process causes the aesthetic value of the pattern of contact areas pressed into the multi-film thermoplastic structure to increase to a desirable level. Below this critical level of energy at 910*c*, the aesthetic value may result in a pattern of contact areas that is difficult to recognize, unnuanced, or otherwise undesirable.

In one or more implementations, increasing heat and pressure during the heat embossing process also increases a flexural rigidity (or stiffness) of the multi-film thermoplastic structure. For example, flexural rigidity refers to a measure of flexibility or rigidity of the multi-film thermoplastic structure. In at least one implementation, the flexural rigidity of the multi-film thermoplastic structure increases in a linearly proportional manner as heat and pressure increase in the contact area formation process until a point where the rigidity plateaus. An increased amount of flexural rigidity in the multi-film thermoplastic structure is desirable as it creates an increased perception of strength and quality of the multi-film thermoplastic bag where the contact areas are incorporated. In one or more implementations, the contact areas can increase the flexural rigidity [microjoule/m] from 1.1 times to 5 times compared to a flat/undeformed film of the same gauge. More particularly, in one or more implementations, the contact areas can increase the flexural rigidity from 1.5 times to 4 times, or 1.5 times to 3 times, or 2 times to 4 times compared to a flat/undeformed film of the same gauge.

Flexural rigidity of the multi-film thermoplastic structure can be measured according to a cantilever test and/or a heart loop test as described in ASTM standard D1388-18. For example, the cantilever test measures flexural rigidity by sliding a strip of the multi-film thermoplastic structure at a specified rate in a direction parallel to its long dimension, until a leading edge of the strip projects from the edge of a horizontal surface. The length of the overhang of the strip is measured when the end of the strip is depressed under its own mass to the point where end of the strip droops by at least a 41.5 degree angle from the horizontal. The flexural rigidity of the multi-film thermoplastic structure is determined based on the length of the overhang. The heart loop test measures flexural rigidity by forming a strip of the multi-film thermoplastic structure into a heart-shaped loop. The length of the loop is measured when it is hanging vertically under its own mass. The flexural rigidity of the multi-film thermoplastic structure is determined based on the length of the loop. Additionally, as shown in FIG. 9, increasing heat and pressure can cause a creation of holes (e.g., micro pores or larger holes) within a multi-film thermoplastic structure. As illustrated, it is possible for the process to create holes in the multi-film thermoplastic structure prior to any significant loss of other physicals (e.g., the molecular strength of the multi-film thermoplastic structure). For example, an amount of heat and pressure beyond the point 910*d* can cause holes to form within one or more layers of the multi-film thermoplastic structure. Holes within the multi-film thermoplastic structure are generally undesirable as they may make the multi-film thermoplastic structure unfit for its intended purpose (e.g., lead to leaks in a trash bag).

Thus, as shown by the arrow 908 in the chart 900, there is a range of heat and pressure that can be applied during the contact area creation process that results in optimized levels for physicals, blocking, pattern (i.e., visual), flexural rigidity, and holes. In one or more implementations, this range includes heating at least one contact roller to a range of 125-425 degrees Fahrenheit. Furthermore, the range includes pressure in the tooling nip at a range of 100-1800 pounds per square inch. Moreover, in at least one implementation, the range also includes speeds of the contact rollers at a range of 500-1200 feet per minute. In alternative implementations, the preferred range may include heats, pressures, or speeds at other ranges.

When operated within the ranges of heat and pressure indicated by the arrow 908 in the chart 900, the contact areas creation process described herein produces contact areas with optimized qualities. For example, in at least one embodiment, a contact area created by the process operating within the optimal heat and pressure ranges exhibits a pattern where the Delta E of the pattern versus separated areas of the films is 0.3 to 50 points higher and more specifically 1.0 to 10.3 points higher. For example, Delta E can refer to the visibility of the contact area and can include one or more of a change in L luminance value associated with the contact area, a change in a-measure of red/green lightness/darkness associated with the contact area, or a change in a b-measure of blue/yellow lightness/darkness associated with the contact area. In one or more implementations, a contact area created by the process operating within the optimal heat and pressure range indicated by the arrow 908 exhibits a pattern where the Delta E of the pattern versus adjacent separated areas of film is 3.1 points higher on average.

Similarly, in at least one embodiment, a contact area created by the process operating within the optimal heat and pressure range indicated by the arrow 908 exhibits physicals where the peak load ratio of the areas including the contact area is between 38% and 100% of the TD tensile strength the films prior to formation of the contact area when measured on a one-inch TD tensile pull test. More specifically the contact area is between 54% and 100% of the TD tensile strength the films prior to formation of the contact area. In one or more implementations, a contact area created by the process operating within the optimal heat and pressure range indicated by the arrow 908 exhibits physicals where the peak load ratio of the contact area is 92% of the TD tensile strength of the pre-processed film. In at least one embodiment, the contact area created by the process operating within the optimal heat and pressure range indicated by the arrow 908 can also exhibit desired levels of puncture resistance and tear values (in the machine and/or transverse direction).

Moreover, in at least one embodiment, a contact area created by the process operating within the optimal heat and pressure range indicated by the arrow 908 exhibits blocking where the peel strength [g/mm] is between 0.00 and 5.20, between 0.00 and 2.60, between 0.00 and 1.70, or between 0.00 and 0.88 when peel forces are exerted on a three-inch T peel between inner bag layers. Specifically, a contact area created by the process operating with the optimal heat and pressure ranges exhibits blocking where the peel strength [g/mm] is 0.29 when peel forces are exerted on a three-inch T peel between inner bag layers. Additionally, in at least one implementation, the contact areas are configured to separate before any layer of the multi-film film or bag fails when subjected to peel forces.

Additionally, as shown in FIG. 9, a contact area created by the process operating within the optimal heat and pressure range indicated by the arrow 908 also exhibits minimal holes. For example, in at least one embodiment, holes may be identified by inflating the multi-film thermoplastic structure including the contact area and checking for light show-through. Holes and blocking associated with multi-film thermoplastic structure may be minimized while maximizing visual and physicals by operating the process within the heat and pressure range indicated by the arrow 908.

Figure 10:
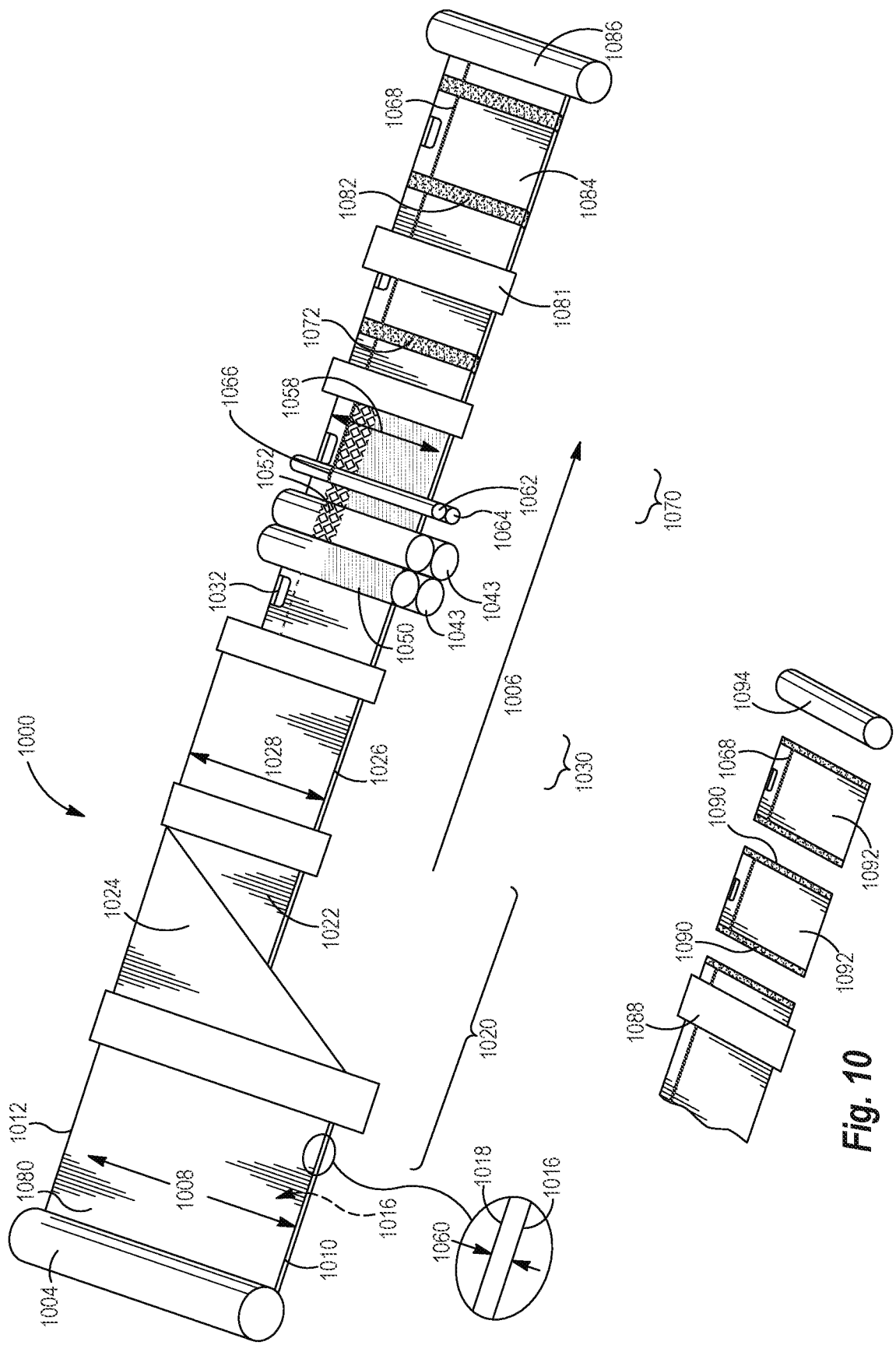
FIG. 10 illustrates a schematic diagram of a process of manufacturing a multi-film thermoplastic bag with a hem seal comprised of a continuous contact area in accordance with one or more implementations of the present disclosure.

To produce a bag having one or more contact areas as described, continuous webs of thermoplastic material may be processed through a high-speed manufacturing environment such as that illustrated in FIG. 10. In the illustrated process 1000, production may begin by unwinding a first continuous web or film 1080 of thermoplastic sheet material from a roll 1004 and advancing the web along a machine direction 1006. The unwound web 1080 may have a width 1008 that may be perpendicular to the machine direction 1006, as measured between a first edge 1010 and an opposite second edge 1012. The unwound web 1080 may have an initial average thickness 1060 measured between a first surface 1016 and a second surface 1018. In other manufacturing environments, the web 1080 may be provided in other forms or even extruded directly from a thermoplastic forming process.

Figure 11:
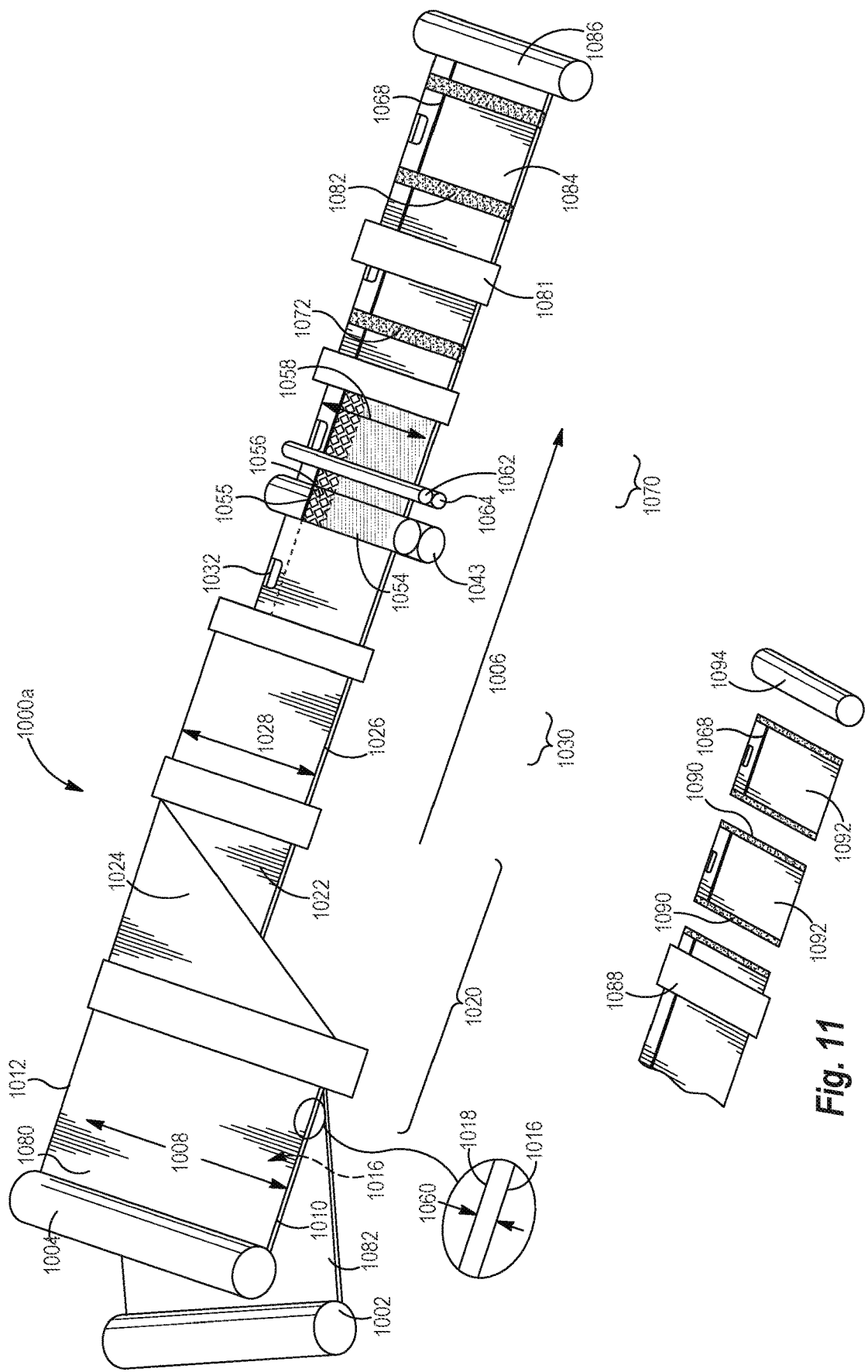
FIG. 11 illustrates a schematic diagram of another process of manufacturing a multi-film thermoplastic bag with a hem seal comprised of a continuous contact area in accordance with one or more implementations of the present disclosure.

In some implementations, as shown in FIG. 11, the illustrated process 1000a involves unwinding a second continuous web or film 1082 of thermoplastic sheet material from a roll 1002 and advancing the web along a machine direction 1006. The second film 1082 can comprise a thermoplastic material, a width, and/or a thickness that is similar or the same as the first film 1080. In alternative one or more implementations, one or more of the thermoplastic material, width, and/or thickness of the second film 1082 can differ from that of the first film 1080. To provide the first and second sidewalls of the finished bag, the films 1080, 1082 may be folded into a first half 1022 and an opposing second half 1024 about the machine direction 1006 by a folding operation 1020. When so folded, the first edge 1010 may be moved adjacent to the second edge 1012 of the web. Accordingly, the width of the films 1080, 1082 proceeding in the machine direction 1006 after the folding operation 1020 may be a width 1028 that may be half the initial width 1008. As may be appreciated, the portion mid-width of the unwound films 1080, 1082 may become the outer edge of the folded films 1080, 1082. In any event, a hem channel may be formed by folding adjacent first and second edges 1010, 1012 over (e.g., at a top edge) and a draw tape 1032 may be inserted into the hem channel during a hem channel and draw tape operation 1030. In some implementations, as shown in FIGS. 10 and 11, the hem channel and draw tape operation 1030 may fold over a length of the first and second edges 1010, 1012 such that a hem skirt is formed (e.g., indicated by the dashed line following the operation 1030) down an inner surface of the multi-film thermoplastic bag.

To form one or more regions of contact areas in a multi-film thermoplastic bag, the processing equipment may include at least one set of contact rollers 1043b where at least one of the rolls is heated, such as those described herein above. Referring to FIG. 10, the folded web 1080 may be advanced along the machine direction 1006 between intermeshing rollers 1043a (e.g., ring rolls, SELFing rollers, or embossing rollers), which impart a pattern 1050 of elements in one portion, zone, area, or section of the resulting multi-film thermoplastic bag.

The folded web 1080 may then advance through the contact rollers 1043b, which impart a pattern 1052 of contact areas to the resulting multi-film thermoplastic bag. In one or more implementations, passing the folded web 1080 between the set of heated contact rollers 1043b creates one or more contact areas between flat portions of the folded web 1080 and the hem skirt (e.g., indicated by the dashed line). For example, the one or more contact areas can extend from the hem channel over the hem skirt toward the bottom edge of the folded web 1080. As shown in FIG. 10, the pattern 1050 of the intermeshing rollers 1043a may be offset from the pattern 1052 of the contact rollers 1043b, such that the patterns imparted to the resulting multi-film thermoplastic bag do not overlap, or partially overlap depending on the offset.

As mentioned above, in one or more implementations, one of the contact rollers 1043b is heated (e.g., a metal contact roller) while other contact roller is unheated (e.g., a rubber contact roller). In such implementations, having heat being applied to the one side of the films 1080, 1082 can cause the contact areas on that heated side be more visually distinct (e.g., darker) and/or have more blocking between the layers on the headed side. Additionally or alternatively, both of the rollers 1043a, 1043b may be heated rollers. For example, each of the rollers 1043a, 1043b may include a rubber roller (e.g., as a top or bottom roller) and a patterned roller.

In at least one embodiment, the processing equipment may include a vision system or sensor system in connection with one or more of the intermeshing rollers 1043a and the contact rollers 1043b. For example, the vision system or sensor system may detect pattern presence, placements, and darkness. Similarly, the sensor system may detect the TD placement of the film (e.g., similar to web breakout or guiding systems). Additionally, the processing equipment may include a force gauge probe to measure the drag of the film across the gauge between inner layers.

To avert imparting a pattern (e.g., of contact areas or otherwise) onto the portion of the web that includes the draw tape 1032, the corresponding ends of the rollers 1043a, 1043b may be smooth and without ridges, grooves, punch elements, or die elements. Thus, the adjacent edges 1010, 1012 and the corresponding portion of the web proximate those edges that pass between the smooth ends of the rollers 1043a, 1043b may not be imparted with any pattern. In alternative implementations, the intermeshing rollers (if present) and the contact rollers are positioned prior to the drawtape insertion process.

The processing equipment may include pinch rollers 1062, 1064 to accommodate the width 1058 of the web 1080. In one or more implementations, the nip rollers can be modified into contact rollers to produce contact areas. For example, in implementations with continuous contact areas, at least one of the pinch rollers 1062, 1064 can be heated and act as contact rollers. As shown in FIG. 10, for instance, pinch roller 1062 includes a punch element 1066 (similar to punch element 408 shown in FIGS. 4A-4B) for producing a hem seal 1068 comprised of a continuous contact area that seals the hem channel across each bag in the machine direction 1006.

In one or more implementations, the heat and pressure of the contact rollers can ensure that there is little to no bonding between the folded halves 1022, 1024 to ensure that the bag 1084 can be opened.

To produce the finished bag, the processing equipment may further process the folded web with at least one region of contact areas. For example, to form the parallel side edges of the finished multi-film thermoplastic bag, the web may proceed through a sealing operation 1070 in which heat seals 1072 may be formed between the folded edge 1026 and the adjacent edges 1010, 1012. The heat seals may fuse together the adjacent halves 1022, 1024 of the folded web. The heat seals 1072 may be spaced apart along the folded web and in conjunction with the folded outer edge 1026 may define individual bags. The heat seals may be made with a heating device, such as, a heated knife. A perforating operation 1081 may perforate the heat seals 1072 with a perforating device, such as, a perforating knife so that individual bags 1092 may be separated from the web. In one or more implementations, the webs may be folded one or more times before the folded webs may be directed through the perforating operation. The web 1080 embodying the bags 1084 may be wound into a roll 1086 for packaging and distribution. For example, the roll 1086 may be placed in a box or a bag for sale to a customer.

In one or more implementations of the process, a cutting operation 1088 may replace the perforating operation 1080. The web is directed through a cutting operation 1088 which cuts the webs at location 1090 into individual bags 1092 prior to winding onto a roll 1094 for packaging and distribution. For example, the roll 1094 may be placed in a box or bag for sale to a customer. The bags may be interleaved prior to winding into the roll 1094. In one or more implementations, the web may be folded one or more times before the folded web is cut into individual bags 1092. In one or more implementations, the bags 1092 may be positioned in a box or bag, and not onto the roll 1094.

FIG. 11 illustrates a modified high-speed manufacturing 1000*a* that involves unwinding a second continuous web or film 1082 of thermoplastic sheet material from a roll 1002 and advancing the web along a machine direction 1006. The second film 1082 can comprise a thermoplastic material, a width, and/or a thickness that is similar or the same as the first film 1080. In alternative one or more implementations, one or more of the thermoplastic material, width, and/or thickness of the second film 1082 can differ from that of the first film 1080. The films 1080, 1082 can be folded together during the folding operation 1020 such that they pass through the contact rollers 1043*c* to form one or more regions of deformations and regions of contact areas in the resulting multi-filmed thermoplastic bags.

As shown by FIG. 11, the contact rollers 1043*c* can comprise hybrid rollers with a first portion 1056 that form contact areas and a second portion 1054 that form deformations (e.g., ring rolling, SELFing, embossing). In addition, the contact rollers 1043*c* include a punch element 1055 for forming a hem seal 1068 comprised of a continuous contact area that seals the hem channel across each bag in the machine direction 1006.

Furthermore, the contact rollers 1043*c* are shown after the draw tape insertion process that also forms a hem skirt (e.g., indicated by the dashed line) by folding over a length of the first and second edges 1010, 1012. As mentioned above, passing layers of the first film 1080 and the second film 1082 between the contact rollers 1043*c* creates one or more contact areas in a least one region between flat portions of the films 1080, 1082 and a hem skirt extending down an inner surface of the films 1080, 1082, where the one or more contact areas also extend from the hem channel over the hem skirt and toward bottom edges of the films 1080, 1082. In alternative implementations the contact rollers 1043*c* can be positioned after the folding operation 1020 or another position in the process 1000*a*. For example, FIGS. 10 and 11 illustrate the rollers 1043*a*, 1043*b*, and 1043*c* being position after the folding operation 1020. In alternative implementations, the rollers 1043*a*, 1043*b*, 1043*c* can be positioned before the folding operation 1020. When positioned after the folding operation 1020, one or more of the rollers 1043*a*, 1043*b*, 1043*c* can create patterns of contact areas on opposing sides of the bag that are mirror images of each other (as shown and mentioned above in relation to FIGS. 7A-7C).

The present disclosure may be embodied in other specific forms without departing from its spirit or essential characteristics. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A multi-layer thermoplastic bag comprising:
    an outer first thermoplastic bag comprising first and second opposing sidewalls joined together along a first side edge, an opposite second side edge, an open first top edge, and a closed first bottom edge;
    an inner second thermoplastic bag positioned within the outer first thermoplastic bag, the inner second thermoplastic bag comprising third and fourth opposing sidewalls joined together along a third side edge, an opposite fourth side edge, an open second top edge, and a closed second bottom edge; and
    the open first top edge and the open second top edge folded over and secured by a hem seal to form a hem channel, wherein:
        the hem seal extends between the first and second side edges with a substantially uniform width on an outside face of the multi-layer thermoplastic bag, and
        the hem seal comprises a lamination gradient such that a lamination strength of the hem seal decreases in a direction extending away from a central longitudinal axis of the hem seal, and
        the lamination strength of the hem seal at the central longitudinal axis of the hem seal is 2 to 5 times greater than the lamination strength of the hem seal at borders of the hem seal.

2. The multi-layer thermoplastic bag of claim 1, wherein:
    the outer first thermoplastic bag has a first appearance;
    the inner second thermoplastic bag has a second appearance created by a pigment, the first appearance differing from the second appearance; and
    the hem seal creates a first contrast relative to the outside face of the multi-layer thermoplastic bag and a second contrast relative to an inside face of the multi-layer thermoplastic bag.

3. The multi-layer thermoplastic bag of claim 1, wherein the hem seal comprises a variable width on an inside face of the multi-layer thermoplastic bag.

4. The multi-layer thermoplastic bag of claim 1, wherein the hem seal is formed by simultaneous application of heat and pressure.

5. The multi-layer thermoplastic bag of claim 4, wherein the simultaneous application of heat and pressure comprises application of heat to an outside face of the outer first thermoplastic bag and application of pressure between the outside face and an inside face of the inner second thermoplastic bag.

6. The multi-layer thermoplastic bag of claim 1, wherein the hem seal comprises no visible air voids between sealed layers of the outer first and inner second thermoplastic bags.

7. The multi-layer thermoplastic bag of claim 1, wherein the hem seal comprises a greater bond strength in layers of the inner second thermoplastic bag relative to layers of the outer first thermoplastic bag.

8. The multi-layer thermoplastic bag of claim 1, wherein the inner second thermoplastic bag comprises a greater tensile strength at the hem seal relative to the outer first thermoplastic bag at the hem seal.

9. The multi-layer thermoplastic bag of claim 1, wherein the hem seal is configured to separate before a material of the inner second thermoplastic bag fails when subjected to peel forces.

10. The multi-layer thermoplastic bag of claim 1, wherein the hem seal comprises a non-linear pattern extending between the first and second side edges of the outer first thermoplastic bag.

11. A thermoplastic bag comprising:
a first sidewall and an opposing second sidewall of a thermoplastic material, the first and second sidewalls connected at a bottom fold and at opposing first and second side edges;
a top opening formed by the first and second sidewalls opposite the bottom fold; and
the top opening comprising a first top edge of the first sidewall and a second top edge of the second sidewall folded over and secured by a hem seal to form a hem channel, wherein:
the hem seal extends between the first and second side edges with a substantially uniform width on an outside face of the thermoplastic bag,
the hem seal comprises a lamination gradient such that a lamination strength of the hem seal decreases in a direction extending away from a central longitudinal axis of the hem seal, and
the lamination strength of the hem seal at the central longitudinal axis of the hem seal is 2 to 5 times greater than the lamination strength of the hem seal at borders of the hem seal.

12. The thermoplastic bag of claim 11, wherein:
the outside face of the thermoplastic bag has a first appearance;
an inside face of the thermoplastic bag has a second appearance created by a pigment, the first appearance differing from the second appearance; and
the hem seal creates a first contrast relative to the outside face of the thermoplastic bag and a second contrast relative to an inside face of the thermoplastic bag.

13. The thermoplastic bag of claim 11, wherein the hem seal comprises a variable width on an inside face of the thermoplastic bag.

14. The thermoplastic bag of claim 11, wherein the hem seal is formed by simultaneous application of heat and pressure.

15. The thermoplastic bag of claim 14, wherein the simultaneous application of heat and pressure comprises application of heat to an outside face of the thermoplastic bag and application of pressure between the outside face and an inside face of the thermoplastic bag.

16. The thermoplastic bag of claim 11, wherein the hem seal comprises no visible air voids between sealed layers of the outer first and inner second thermoplastic bags.

17. The thermoplastic bag of claim 11, wherein the hem seal comprises a greater bond strength in inner layers of the thermoplastic bag relative to outer layers of the thermoplastic bag.

18. The thermoplastic bag of claim 17, wherein the inner layers of the thermoplastic bag comprise a greater tensile strength at the hem seal relative to the outer layers of the thermoplastic bag at the hem seal.

19. The thermoplastic bag of claim 11, wherein the hem seal is configured to separate before a material of the thermoplastic bag when subjected to peel forces.

20. The thermoplastic bag of claim 11, wherein the hem seal comprises a non-linear pattern extending between the first and second side edges of the thermoplastic bag.

* * * * *